US012811500B2

(12) United States Patent
de Marco

(10) Patent No.: US 12,811,500 B2
(45) Date of Patent: Nov. 24, 2026

(54) DISCHARGE UNIT

(71) Applicant: Renesas Design (UK) Limited, Bourne End (GB)

(72) Inventor: Louis de Marco, Swindon (GB)

(73) Assignee: Renesas Design (UK) Limited, Bourne End (GB)

( * ) Notice: Subject to any disclaimer, the term of this patent is extended or adjusted under 35 U.S.C. 154(b) by 206 days.

(21) Appl. No.: 18/440,709

(22) Filed: Feb. 13, 2024

(65) Prior Publication Data

US 2025/0260321 A1 Aug. 14, 2025

(51) Int. Cl.
*H02M 3/158* (2006.01)
*H02M 3/155* (2006.01)

(52) U.S. Cl.
CPC ......... *H02M 3/158* (2013.01); *H02M 3/1552* (2021.05)

(58) Field of Classification Search
CPC .... H02M 3/158; H02M 3/155; H02M 3/1552; H02M 3/15555; H02M 3/1557; H02M 3/156; H02M 3/1563; H02M 3/1566; H02M 3/157; H02M 3/1582; H02M 3/1584; H02M 3/1586; H02M 3/1588
See application file for complete search history.

(56) References Cited

U.S. PATENT DOCUMENTS 6,002,213 A * 12/1999 Wood .................. H03K 17/063 315/307
2024/0364223 A1* 10/2024 Cohen ................ H02M 1/0025

* cited by examiner

*Primary Examiner* — Nguyen Tran
(74) *Attorney, Agent, or Firm* — SCULLY, SCOTT, MURPHY & PRESSER, P.C.

(57) ABSTRACT

A discharge unit for a power converter comprising an inductive element, the discharge unit configured to: sense a voltage difference across the inductive element; and activate a discharge path for the power converter based on the voltage difference.

22 Claims, 18 Drawing Sheets

100

DISCHARGE UNIT

The present disclosure relates to a discharge unit. In particular, the present disclosure relates to a discharge unit for a power converter comprising an inductive element.

BACKGROUND

Power converters often comprise an inductive element for storing energy. There are situations where the inductive element is storing energy that cannot be delivered to a load or safely discharged as a current through a low impedance node. In this situation, if the inductive element forces the current into a high impedance node, it will cause the voltage to raise till some damaging breakdown mechanism occurs. Therefore a safe means of discharging the inductive element is required.

Power converters can be utilised as part of the gate driver unit (GDU) for inverters in electric vehicle applications. Each GDU requires its own power converter with its own inductive element requiring a safe means of discharging.

SUMMARY

It is desirable to provide an improved discharge unit for a power converter.

With the increasing electrification of vehicles, it is desirable to design electric vehicle systems that are efficient and cost effective by improving voltage discharging methods in power converters.

According to a first aspect of the disclosure there is provided a discharge unit for a power converter comprising an inductive element, the discharge unit configured to: sense a voltage difference across the inductive element; and activate a discharge path for the power converter based on the voltage difference.

Optionally, the inductive element is coupled between a first node providing a first voltage and a second node providing a second voltage.

Optionally, the inductive element comprises at least one of an inductor; a transformer.

Optionally, comprising a voltage sensing unit for sensing the voltage difference across the inductive element.

Optionally, the inductive element is coupled between a first node providing a first voltage and a second node providing a second voltage.

Optionally, the voltage sensing unit is configured to receive the first voltage and the second voltage; and the voltage difference is the difference between the first voltage and the second voltage.

Optionally, the voltage sensing unit is configured to compare the voltage difference to a threshold voltage; and the discharge unit is configured to activate the discharge path based on the comparison of the voltage difference to the threshold voltage, thereby activating the discharge path based on the voltage difference.

Optionally, the threshold voltage is a pre-set value.

Optionally, the voltage sensing unit comprises at least one series of one or more Zener diodes such that the threshold voltage is proportional to the number of Zener diodes.

Optionally, the voltage sensing unit is configured to activate the discharge path for the power converter when the voltage difference is greater than the threshold voltage, thereby activating the discharge path based on the comparison of the voltage difference to the threshold voltage.

Optionally, the voltage sensing unit comprises at least one series of one or more Zener diodes, the threshold voltage being proportional to the number of Zener diodes such that when the voltage difference is greater than the threshold voltage, a conduction current is conducted through the at least one series of one or more Zener diodes.

Optionally, the voltage sensing unit comprises a resistive element such that when the conduction current is conducted through the at least one series of one or more Zener diodes, an activation voltage is generated.

Optionally, the discharge unit is configured to deactivate the discharge path for the power converter based on the voltage difference.

Optionally, the voltage sensing unit is configured to compare the voltage difference to a threshold voltage; and the discharge unit is configured to deactivate the discharge path based on the comparison of the voltage difference to the threshold voltage, thereby deactivating the discharge path based on the voltage difference.

Optionally, the voltage sensing unit is configured to deactivate the discharge path for the power converter when the voltage difference is less than the threshold voltage, thereby deactivating the discharge path based on the comparison of the voltage difference to the threshold voltage.

Optionally, the voltage sensing unit comprises at least one series of one or more Zener diodes, the threshold voltage being proportional to the number of Zener diodes such that when the voltage difference is less than the threshold voltage, a conduction current is not conducted through the at least one series of one or more Zener diodes.

Optionally, the voltage sensing unit comprises a resistive element such that when the conduction current is not conducted through the at least one series of one or more Zener diodes, an activation voltage is not generated.

Optionally, the discharge path comprises a first current source.

Optionally, comprising a voltage sensing unit for sensing the voltage difference across the inductive element.

Optionally, the voltage sensing unit is configured to compare the voltage difference to a threshold voltage; and the discharge unit is configured to activate the discharge path based on the comparison of the voltage difference to the threshold voltage, thereby activating the discharge path based on the voltage difference.

Optionally, the voltage sensing unit is configured to activate the discharge path for the power converter when the voltage difference is greater than the threshold voltage, thereby activating the discharge path based on the comparison of the voltage difference to the threshold voltage; and the voltage sensing unit is configured to activate the first current source when the voltage difference is greater than the threshold voltage.

Optionally, the voltage sensing unit comprises at least one series of one or more Zener diodes, the threshold voltage being proportional to the number of Zener diodes such that when the voltage difference is greater than the threshold voltage, a current is conducted through the at least one series of one or more Zener diodes.

Optionally, the voltage sensing unit comprises a resistive element such that when the current is conducted through the at least one series of one or more Zener diodes, an activation voltage is generated.

Optionally, the first current source is activated by the activation voltage.

Optionally, the first current source comprises a first transistor and a second transistor, both the first and second transistor comprising a control terminal coupled to the resistive element such that when the activation voltage is generated both the first and second transistors are turned on.

Optionally, when both the first and second transistors are turned on, they conduct a first current.

Optionally, the discharge path comprises a clamping switch coupled to the first current source.

Optionally, comprising a voltage sensing unit for sensing the voltage difference across the inductive element.

Optionally, the voltage sensing unit is configured to compare the voltage difference to a threshold voltage; and the discharge unit is configured to activate the discharge path based on the comparison of the voltage difference to the threshold voltage, thereby activating the discharge path based on the voltage difference.

Optionally, the voltage sensing unit is configured to activate the discharge path for the power converter when the voltage difference is greater than the threshold voltage, thereby activating the discharge path based on the comparison of the voltage difference to the threshold voltage; and the discharge unit is configured to close the clamping switch when the voltage difference is greater than the threshold voltage.

Optionally, the inductive unit is discharged via the clamping switch when the voltage difference is greater than the threshold voltage.

Optionally, the clamping switch is configured to operate at the threshold voltage.

Optionally, the voltage sensing unit is configured to activate the first current source when the voltage difference is greater than the threshold voltage.

Optionally, the voltage sensing unit comprises at least one series of one or more Zener diodes, the threshold voltage being proportional to the number of Zener diodes such that when the voltage difference is greater than the threshold voltage, a current is conducted through the at least one series of one or more Zener diodes.

Optionally, the voltage sensing unit comprises a resistive element such that when the current is conducted through the at least one series of one or more Zener diodes, an activation voltage is generated.

Optionally, the first current source is activated by the activation voltage.

Optionally, the first current source comprises a first transistor and a second transistor, both the first and second transistor comprising a control terminal coupled to the resistive element such that when the activation voltage is generated both the first and second transistors are turned on.

Optionally, when both the first and second transistors are turned on, they conduct a first current.

Optionally, the clamping switch is a third transistor comprising a control terminal coupled to the first and second transistors.

Optionally, the clamping switch is configured to turn on when it receives the first current.

Optionally, the voltage discharge unit is configured to deactivate the discharge path for the power converter based on the voltage difference.

Optionally, comprising a voltage sensing unit for sensing the voltage difference across the inductive element.

Optionally, the voltage sensing unit is configured to compare the voltage difference to a threshold voltage; and the discharge unit is configured to deactivate the discharge path based on the comparison of the voltage difference to the threshold voltage, thereby deactivating the discharge path based on the voltage difference.

Optionally, the voltage sensing unit is configured to deactivate the discharge path for the power converter when the voltage difference is less than the threshold voltage, thereby deactivating the discharge path based on the comparison of the voltage difference to the threshold voltage; and the voltage sensing unit is configured to deactivate the first current source if the voltage difference is less than the threshold voltage.

Optionally, the voltage sensing unit comprises at least one series of one or more Zener diodes, the threshold voltage being proportional to the number of Zener diodes such that when the voltage difference is greater than the threshold voltage, a current is not conducted through the at least one series of one or more Zener diodes.

Optionally, the voltage sensing unit comprises a resistive element such that when the current is not conducted through the at least one series of one or more Zener diodes, an activation voltage is not generated.

Optionally, the first current source is deactivated as the activation voltage is not generated.

Optionally, the first current source comprises a first transistor and a second transistor, both the first and second transistor comprising a control terminal coupled to the resistive element such that when the activation voltage is generated both the first and second transistors are turned on, when the activation voltage is not generated both the first and second transistors are turned off.

Optionally, when both the first and second transistors are turned on, they conduct a first current and when both the first and second transistors are turned off, they do not conduct the first current.

Optionally, the discharge path comprises a clamping switch coupled to the first current source.

Optionally, the voltage discharge unit is configured to open the clamping switch when the voltage difference is less than the threshold voltage.

Optionally, the discharge unit comprises a second current source coupled to the clamping switch.

Optionally, the second current source is configured to open the clamping switch when the voltage difference is less than the threshold voltage.

Optionally, the second current source comprises a resistive element.

Optionally, the discharge unit comprising an isolation device.

Optionally, the isolation device is coupled to the second node providing the second voltage; and the isolation device is configured to block a conductive path between the first node and the second node when the second node is coupled to ground.

Optionally, the power converter comprises a power switch coupled to ground, the switch being configured to operate in an on state or an off state.

Optionally, the inductive element is coupled between a first node providing a first voltage and a second node providing a second voltage; and the power switch is also coupled to the second node providing the second voltage.

Optionally, the discharge unit comprising an isolation device.

Optionally, the isolation device is coupled to the second node.

Optionally, the isolation device is configured to block a conductive path between the first node and the second node when the power switch is in the on state and hence the second node is coupled to ground.

According to a second aspect of the disclosure there is provided an apparatus comprising: a power converter comprising an inductive element; and a discharge unit for the power converter, the discharge unit configured to: sense a voltage difference across the inductive element; and activate a discharge path for the power converter based on the voltage difference.

Optionally, the apparatus being a gate drive unit for a traction inverter.

Optionally, comprising a chip, the power converter and the discharge unit being implemented on the chip.

It will be appreciated that the apparatus of the second aspect may include features as set out in relation to the first aspect and can incorporate other features as described herein.

According to a third aspect of the disclosure there is provided a method of discharging a power converter comprising an inductive element, the method comprising: sensing a voltage difference across the inductive element; and activating a discharge path for the power converter based on the voltage difference.

It will be appreciated that the method of the third aspect may include using and/or providing features as set out in the first aspect and/or second aspect, and can incorporate other features as described herein.

BRIEF DESCRIPTION OF THE DRAWINGS

The description is described in further detail below by way of example only and with reference to the accompanying drawings, in which:

FIG. 4(*c*) is the second example embodiment of the voltage sensing unit for when the voltage sensing unit senses a voltage difference less than a threshold voltage;

FIG. 6(*b*) is a second example embodiment of a voltage sensing unit coupled to a first current source that can be used with the discharge unit of FIG. 5;

FIG. 8(*b*) is an example embodiment of a voltage sensing unit deactivating a discharge path for a power converter;

FIG. 14(*b*) is a second example embodiment of an isolation device that can be used with any of the discharge units of the present disclosure;

DETAILED DESCRIPTION

For power converters with an inductive element, such as inductive element where the inductive element is storing energy that cannot be safely delivered to a load or safely discharged through a low impedance node, the indictive element will force a current through a high impedance node causing the voltage in the circuit to rise until damaging breakdown mechanisms occur. There are a number of situations where this can occur. For example, when a low side switch drives an inductive load without any recirculation path for the energy to discharge when the low side switch is turned off.

A type of power converter that such an unsafe discharge event can occur in is a flyback converter.

Figure 1:
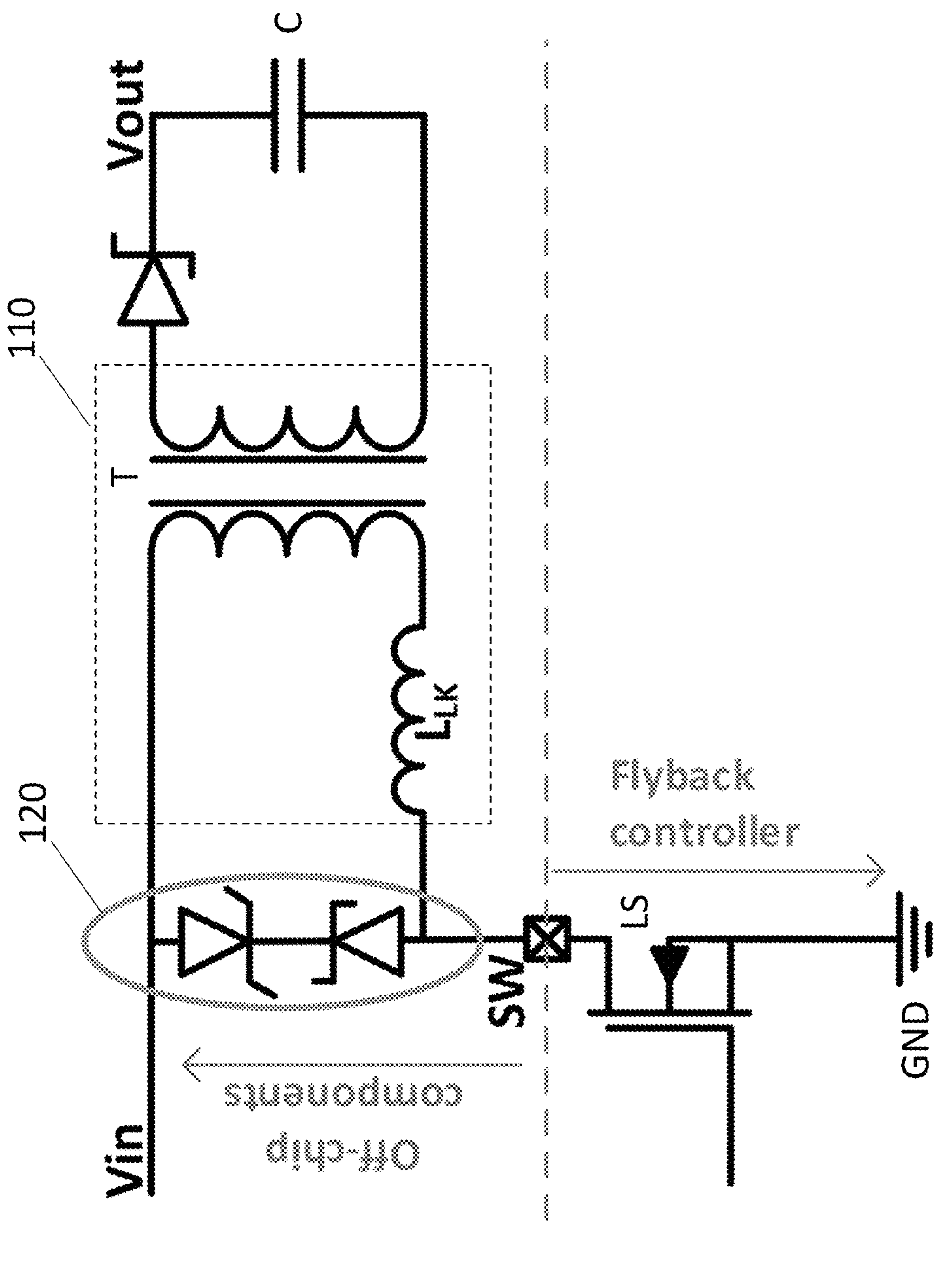
Figure 1 (Prior Art)
FIG. 1 is a diagram of a flyback power converter according to the prior art.

FIG. 1 is a diagram of a flyback converter 100 according to the prior art. The flyback converter 100 comprises a low side switch LS coupled between ground GND and a node SW. The flyback converter 100 further comprises an inductive element 110. In this example embodiment of the prior art, the inductive element 110 comprises an inductor LLK coupled to a transformer T.

In normal mode of operation, when the low side switch LS is in an on state, the primary side winding of transformer T is charged. When the low side switch LS is in the off state, the energy stored on the primary side winding is transferred to the secondary side winding of the transformer T.

Any energy that can't be transferred between the primary and secondary windings is represented as a leakage inductance LLK coupled to the primary side winding of transformer T. Each time the low side switch LS turns off, the energy stored in LLK has nowhere to go. This results in the node SW to fly to a high voltage that can be destructive at least for the low side switch LS and the semiconductor chip which hosts the Flyback controller (not shown in FIG. 1). A common solution is to place a voltage clamp 120 across the primary of the transformer T to clamp the voltage of node SW to some safe value above the input voltage Vin of the flyback converter 100. Then the energy on the leakage inductance can safely discharge when the low side switch LS is turned off. In the flyback converter 100 shown in FIG. 1, the voltage clamp 120 is implemented using a combination of Zener diodes and Schottky diodes. In other embodiments, an external resistor-capacitor snubber could be used.

These solutions can be applied to other types of power converter. The known solutions in the prior art to safely discharge the energy of the inductor LLK require off-chip components which increases the cost and size of the circuitry.

Power converters, such as the flyback converter shown in FIG. 1, for example can be used as part of the gate driver unit for an inverter. High voltage gate driver units (GDUs) drive the switches of inverters in electric vehicle applications. Each GDU requires a particular voltage to drive the gate of the insulated gate bipolar transistors (IGBTs) or silicon carbide (SiC) power switches. These particular voltages are not available in the system and are instead generated by a power converter such as a flyback converter. Due to the galvanic isolation requirements needed in automotive systems, at least each of the high side switches of the inverter need to have a separate flyback converter for each GDU. The most common configuration used for electric vehicles is a distributed architecture, where each switch of the inverter has a GDU with its separate flyback converter. This architecture requires 12 external voltage clamps to add to the GDUs board. For example, for a 400V/100 KW Traction Inverter, the extra area needed for these off-chip voltage clamps is approximately 50 $mm^2$.

One of the driving requirements in the race for the electrification of transport is to design traction inverters with the highest power density (more compact) and reduce costs. Therefore an improved means of safely discharging the inductive element of a power converter is required to reduce costs and area of circuitry involved.

Figure 2:
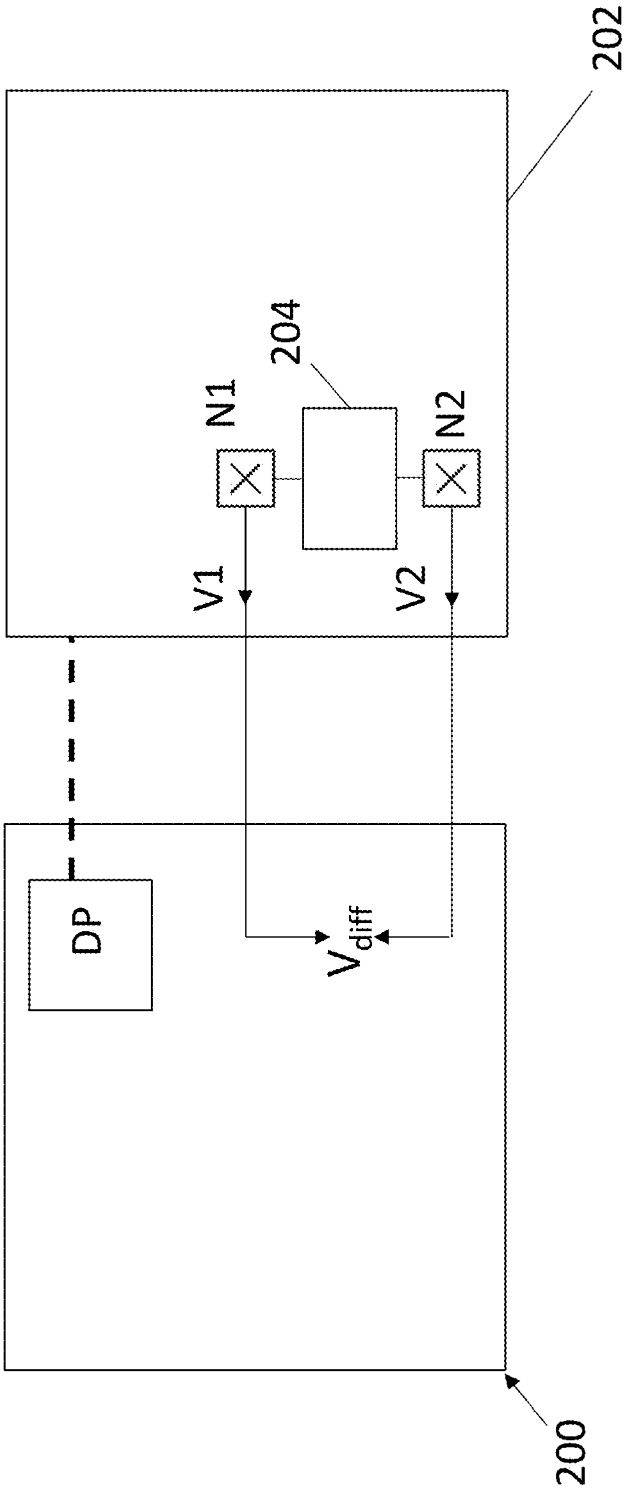
FIG. 2 is a diagram of an example embodiment of a discharge unit for a power converter according to the present disclosure.

FIG. 2 is a diagram of an example embodiment of a discharge unit 200 for a power converter 202 in accordance with a first embodiment of the present disclosure. The power converter 202 comprises an inductive element 204. The inductive element 204 is coupled between a first node N1 providing a first voltage V1 and a second node N2 providing a second voltage N2. The inductive element 204, for example, can comprise at least one of an inductor or a transformer. This is not an exhaustive list of elements that can be used.

The discharge unit 200 is configured to sense a voltage difference $V_{diff}$ across the energy storage element 204. The voltage difference is the difference between the first voltage V1 and the second voltage V2. The discharge unit 200 is further configured to activate a discharge path DP for the power converter 202 based on the voltage difference $V_{diff}$.

Figure 3:
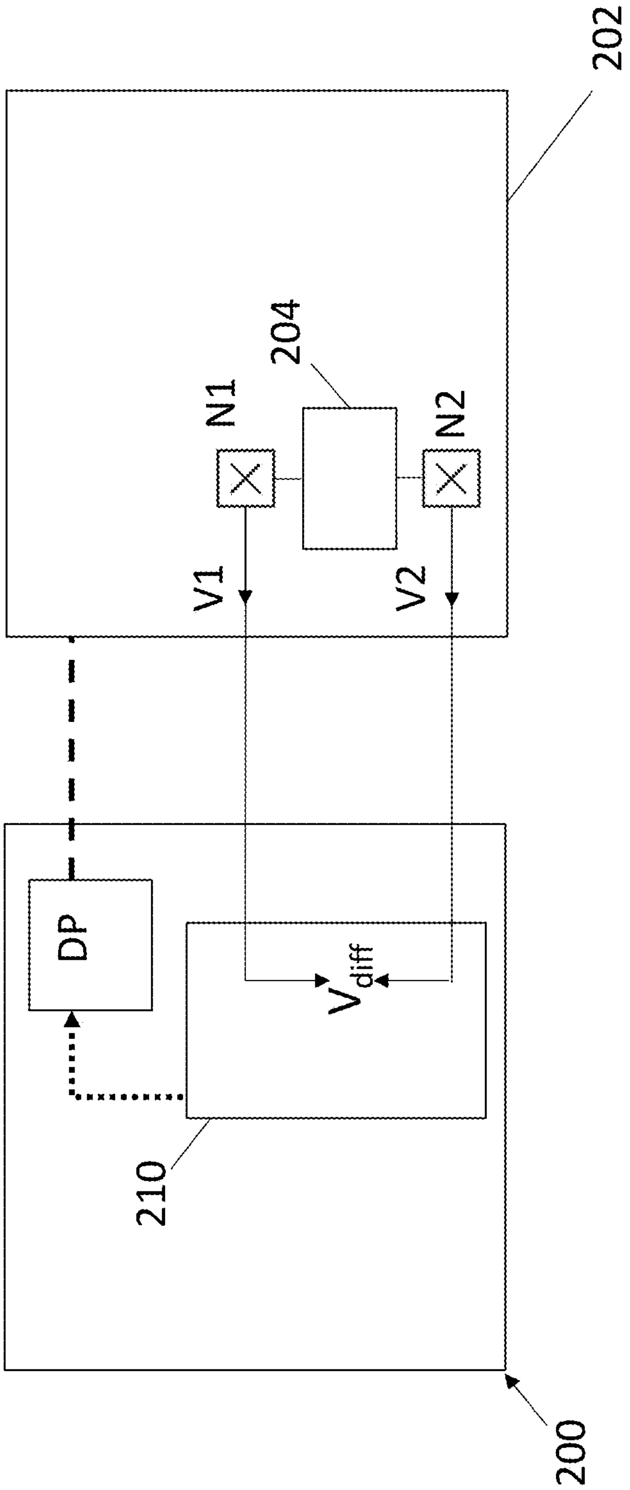
FIG. 3 is a diagram of another example embodiment of a discharge unit for a power converter to the present disclosure.

FIG. 3 is a diagram of another example embodiment of a discharge unit 200 for a power converter 202 according to a second embodiment of the present disclosure. The power converter 202 is the same as the power converter of FIG. 2, therefore the same labelling has been kept and the components are taken to have the same functionality and meaning as for FIG. 2. The discharge unit 200 is the same as the one in FIG. 2 with the addition of feature 210. Therefore the same labelling has been kept and the components are taken to have the same functionality and meaning as for the discharge unit 200 of FIG. 2.

The discharge unit 200 comprises a voltage sensing unit 210 for sensing the voltage difference $V_{diff}$ across the inductive element 204. The energy storage element 204 is coupled between a first node N1 providing a first voltage V1 and a second node N2 providing a second voltage V2.

The voltage sensing unit 210 is configured to receive the first voltage V1 and the second voltage V1. The voltage difference $V_{diff}$ sensed by the voltage sensing unit 210 is the difference between the first voltage V1 and the second voltage V2. The voltage sensing unit 210 is further configured to compare the voltage difference $V_{diff}$ to a threshold voltage $V_{thresh}$. Depending on this comparison, the discharge unit 210 is configured to activate the discharge path DP for the power converter 200. The discharge path DP is activated when the voltage difference $V_{diff}$ is greater than the threshold voltage. In other words, when $V_{diff}$ (=V2−V1)>$V_{thresh}$, the discharge path DP is active. The discharge unit 210 is further configured to deactivate the discharge path DP for the power converter 200 based on the voltage difference $V_{diff}$. The discharge path DP is deactivated when the voltage difference $V_{diff}$ is less than the threshold voltage. In other words, when $V_{diff}$ (=V2−V1)<$V_{thresh}$, the discharge path DP is not active.

The threshold voltage $V_{thresh}$ can be a pre-set value. For example, the threshold voltage $V_{thresh}$ can be se to be equal to the maximum breakdown voltage for the components in the discharge unit 200 and the power converter 202. The threshold voltage $V_{thresh}$ can be set by the voltage sensing unit 210.

Figure 4C:
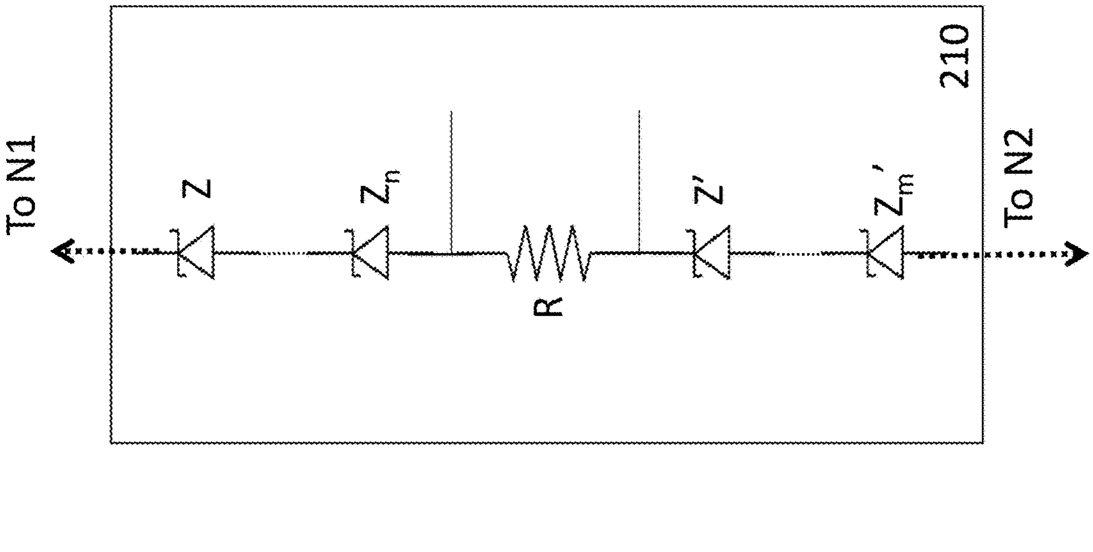
FIG. 4(*a*) is a first example embodiment of a voltage sensing unit that can be used with the discharge unit of FIG. 3, FIG. 4(*b*) is a second example embodiment of a voltage sensing unit that can be used with the discharge unit of FIG. 3.
Figure 4B:
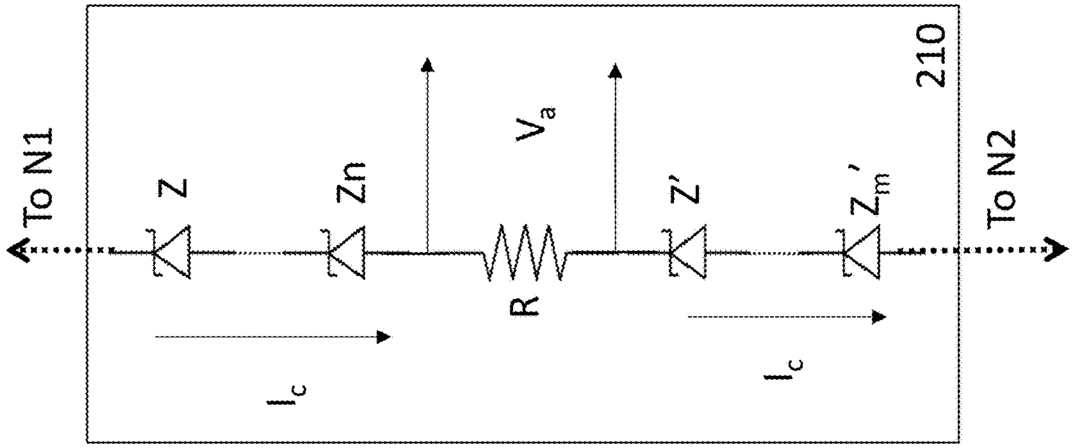
Figure 4A:
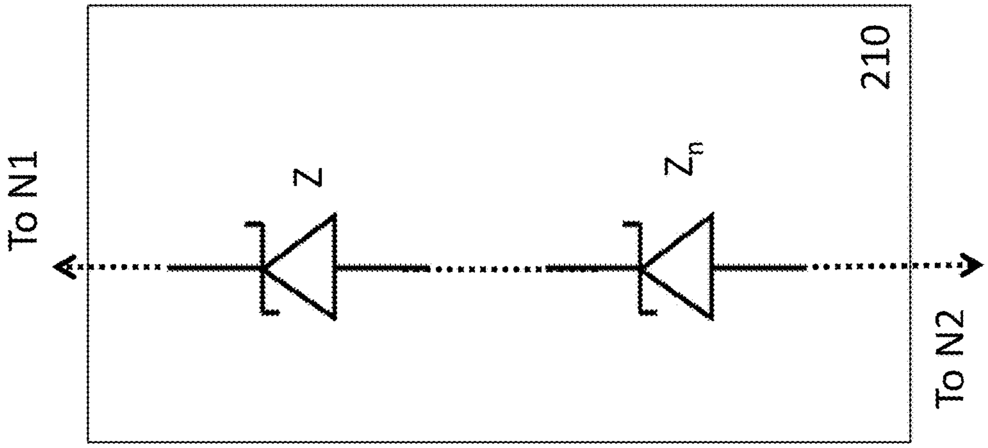

FIG. 4(*a*) is a first example embodiment of a voltage sensing unit 210 that can be used with any of the discharge units 200 of the present disclosure. The arrows in the diagram pointing towards the nodes N1 and N2 illustrate the coupling points of the voltage sensing unit 210 to the nodes N1, N2. It is understood that other couplings may be possible in accordance with the understanding of the skilled person. In this first example embodiment of the voltage sensing unit 210, the voltage sensing unit 210 a series of one or more Zener diodes Z to $Z_n$. In this embodiment, the threshold voltage is proportional to the number of Zener diodes in the series. In other words, $V_{thresh}$ on, where n is the total number of Zener diodes in the series.

FIG. 4(*b*) is a second example embodiment of a voltage sensing unit 210 that can be used with any of the discharge units 200 of the present disclosure. The arrows in the diagram pointing towards the nodes N1 and N2 illustrate the coupling points of the voltage sensing unit 210 to the nodes N1, N2. It is understood that other couplings may be possible in accordance with the understanding of the skilled person. In this second example embodiment of the voltage sensing unit 210, the voltage sensing unit 210 comprises a first series of one or more Zener diodes Z to $Z_n$ and a second series of one or more Zener diodes Z' to $Z_m$'. In one example embodiment, the first series and the second series of one or more Zener diodes have the same total number of Zener diodes. In other words, n=m. The threshold voltage $V_{thresh}$ in this case would be proportional to the number of Zener diodes, n=m, in one of the series. In other words, $V_{thresh} \propto n$, where n is the total number of Zener diodes in one of the series and n=m. In another example embodiment, the first series and the second series of one or more Zener diodes do not have the same total number of Zener diodes. In other words, n is not equal to m. The threshold voltage $V_{thresh}$ in this case would be proportional to the total sum of Zener diodes in each series. In other words, $V_{thresh} \propto (n+m)$, where n is the total number of Zener diodes in the first series and m is the total number of Zener diodes in the second series. The voltage sensing unit 210 further comprises a resistive element R which is coupled between the first series of one or more Zener diodes and the second series of one or more Zener diodes. The resistive element could be, for example, a resistor.

When the voltage difference $V_{diff}$ is greater than the threshold voltage $V_{thresh}$, a conduction current $I_c$ is conducted through the first series and the second series of one or more Zener diodes and across the resistive element R such that an activation voltage $V_a$ is generated. The voltage sensing unit 210 is shown as a combination of (integrated) Zener diodes and resistors. The voltage sensing unit 210 has the function to conduct current $I_c$ only when $V_{diff}$ (=V2−V1) has reached the threshold voltage $V_{thresh}$.

FIG. 4(*c*) is an alternative schematic to the example embodiment of the voltage sensing unit 210 of FIG. 4(*b*) for the operational configuration when a current is not conducted through the voltage sensing unit 210. The voltage sensing unit 210 is the same as the voltage sensing unit of FIG. 4(*b*), therefore the same labelling has been kept and the components are taken to have the same functionality and meaning as for FIG. 4(*b*). The arrows in the diagram pointing towards the nodes N1 and N2 illustrate the coupling points of the voltage sensing unit 210 to the nodes N1, N2. It is understood that other couplings may be possible in accordance with the understanding of the skilled person. When the voltage difference $V_{diff}$ is less than the threshold voltage $V_{thresh}$, the conduction current $I_c$ is not conducted through the first series of one or more Zener diodes or the second series of one or more Zener diodes. Hence no activation voltage $V_a$ is generated across the resistive element R.

Figure 5:
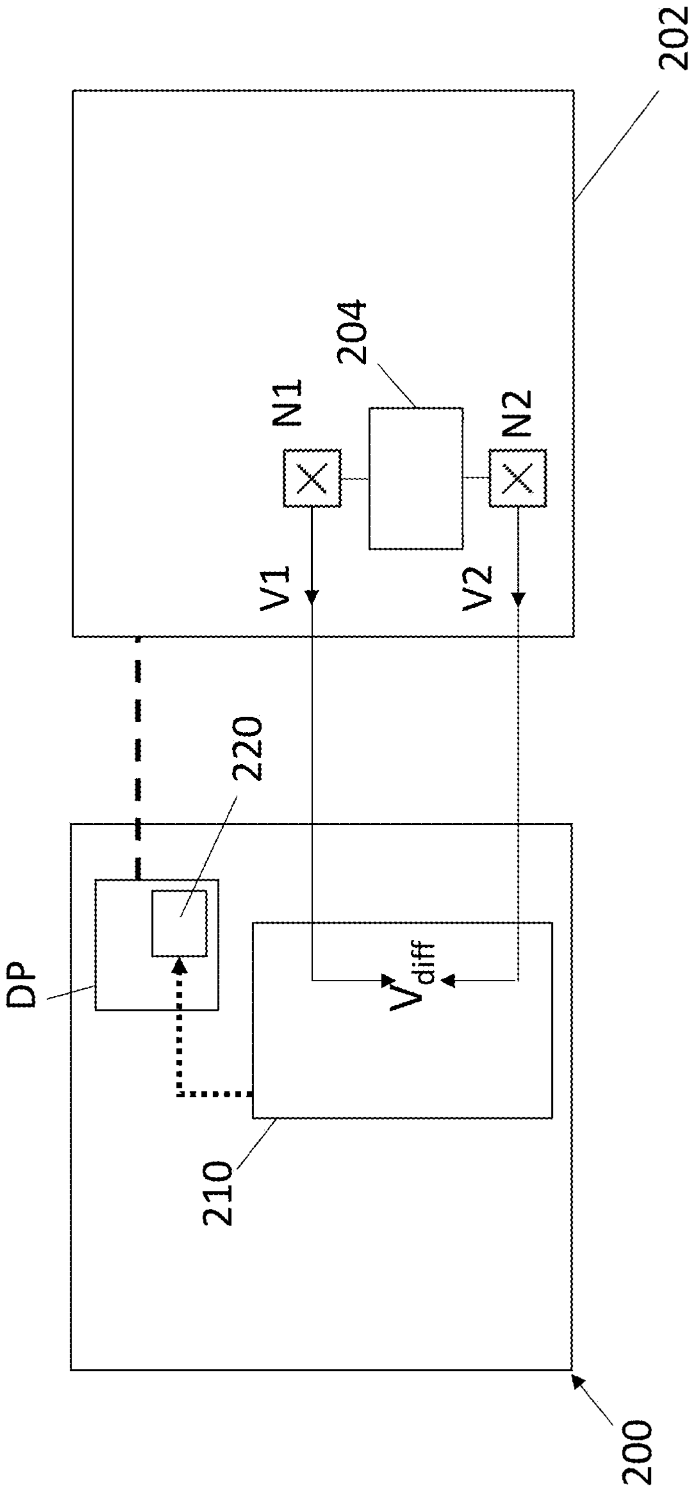
FIG. 5 is a diagram of another example embodiment of a discharge unit for a power converter according to the present disclosure.

FIG. 5 is a diagram of another example embodiment of a discharge unit 200 for a power converter 202 in accordance with a third embodiment of the present disclosure. The power converter 202 is the same as the power converter of FIG. 3, therefore the same labelling has been kept and the components are taken to have the same functionality and meaning as for FIG. 3. The discharge unit 200 is the same as the one in FIG. 3 with the addition of feature 220. Therefore the same labelling has been kept and the components are taken to have the same functionality and meaning as for the discharge unit 200 of FIG. 3. The discharge path DP comprises a first current source 220 coupled to the voltage sensing unit 210.

The voltage sensing unit 210 is configured to activate the first current source 220 when the voltage difference $V_{diff}$ is greater than the threshold voltage $V_{thresh}$, such that when the first current source 220 is activated then the discharge path DP for the power converter 200 is also activated.

Figure 6A:
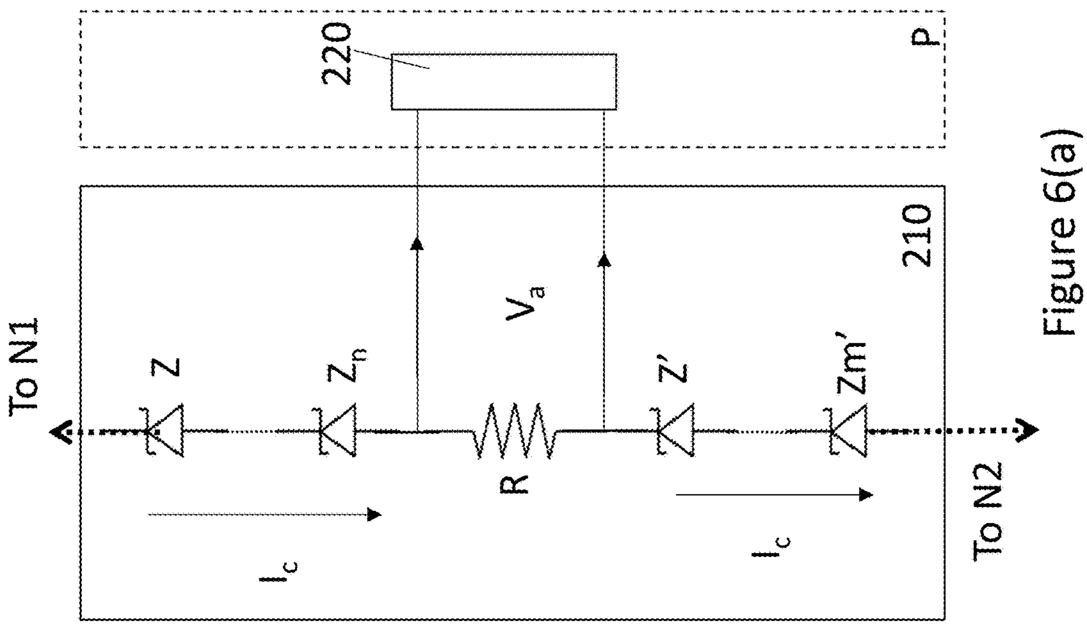
FIG. 6(*a*) is a first example embodiment of a voltage sensing unit coupled to a first current source that can be used with the discharge unit of FIG. 5.
Figure 6B:
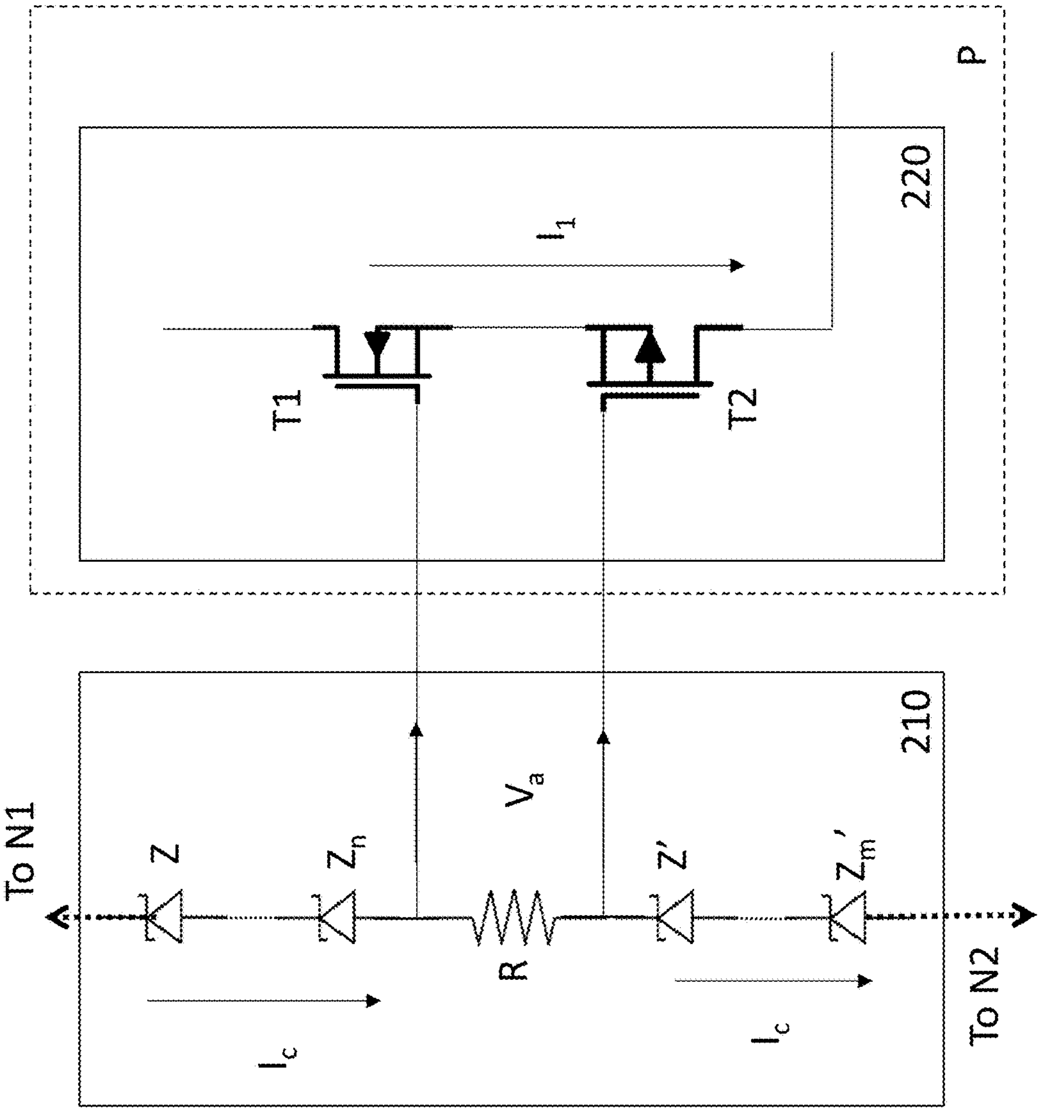

FIG. 6(*a*) is a first example embodiment of a voltage sensing unit 210 coupled to a first current source 220. The example embodiment of this figure can be used with any discharge unit 200 of the present disclosure. The arrows in the diagram pointing towards the nodes N1 and N2 illustrate the coupling points of the voltage sensing unit 210 to the nodes N1, N2. It is understood that other couplings may be possible in accordance with the understanding of the skilled person. The voltage sensing unit 210 comprises a first series of one or more Zener diodes Z to $Z_n$ and a second series of one or more Zener diodes Z' to $Z_m'$. In one example embodiment, the first series and the second series of one or more Zener diodes have the same total number of Zener diodes. In other words, n=m. The threshold voltage $V_{thresh}$ in this case would be proportional to the number of Zener diodes, n=m, in one of the series. In other words, $V_{thresh} \propto n \times V_{zener}$, where n is the total number of Zener diodes in one of the series and n=m. The voltage $V_{zener}$ is the breakdown voltage of each Zener diode. In another example embodiment, the first series and the second series of one or more Zener diodes do not have the same total number of Zener diodes. In other words, n is not equal to m. The threshold voltage $V_{thresh}$ in this case would be proportional to the total sum of Zener diodes in each series. In other words, $V_{thresh} \propto (n+m) \times V_{zener}$, where n is the total number of Zener diodes in the first series and m is the total number of Zener diodes in the second series. The voltage $V_{zener}$ is the breakdown voltage of each Zener diode. The voltage sensing unit 210 further comprises a resistive element R which is coupled between the first series of one or more Zener diodes and the second series of one or more Zener diodes. The resistive element could be, for example, a resistor.

When the voltage difference $V_{diff}$ is greater than the threshold voltage $V_{thresh}$, a conduction current $I_c$ is conducted through the first series and the second series of one or more Zener diodes and across the resistive element R such that an activation voltage $V_a$ is generated. The first current source 220 is then activated by the activation voltage $V_a$. The voltage sensing unit 210 has the function to conduct current $I_c$ only when $V_{diff}$ (=V2−V1) has reached the threshold voltage $V_{thresh}$. Hence, the first current source is only activated when $V_{diff}$ (=V2−V1) has reached the threshold voltage $V_{thresh}$.

FIG. 6(*b*) is a second example embodiment of a voltage sensing unit 210 coupled to a first current source 220. The example embodiment of this figure can be used with any discharge unit 200 of the present disclosure. The arrows in the diagram pointing towards the nodes N1 and N2 illustrate the coupling points of the voltage sensing unit 210 to the nodes N1, N2. It is understood that other couplings may be possible in accordance with the understanding of the skilled person. The voltage sensing unit 210 shown in this figure is the same as the one shown in FIG. 6(*a*), therefore the same labelling has been kept and the components are taken to have the same functionality and meaning as for FIG. 6(*a*).

The first current source 220 comprises a first transistor T1 comprising a control terminal and a second transistor T2 comprising a control terminal. The first transistor T1 is coupled to the second transistor T2 in series. Both the first T1 and the second T2 transistors are coupled to the resistive element R of the voltage sensing unit 210 via their control terminals.

When the activation voltage $V_a$ is generated, both the first transistor T1 and the second transistor T2 are turned on and they both conduct a first current $I_1$. Hence, when the voltage difference $V_{diff}$ is less than the threshold voltage $V_{thresh}$ and no activation voltage $V_a$ is generated, the first T1 and second T2 transistors are turned off.

Figure 7:
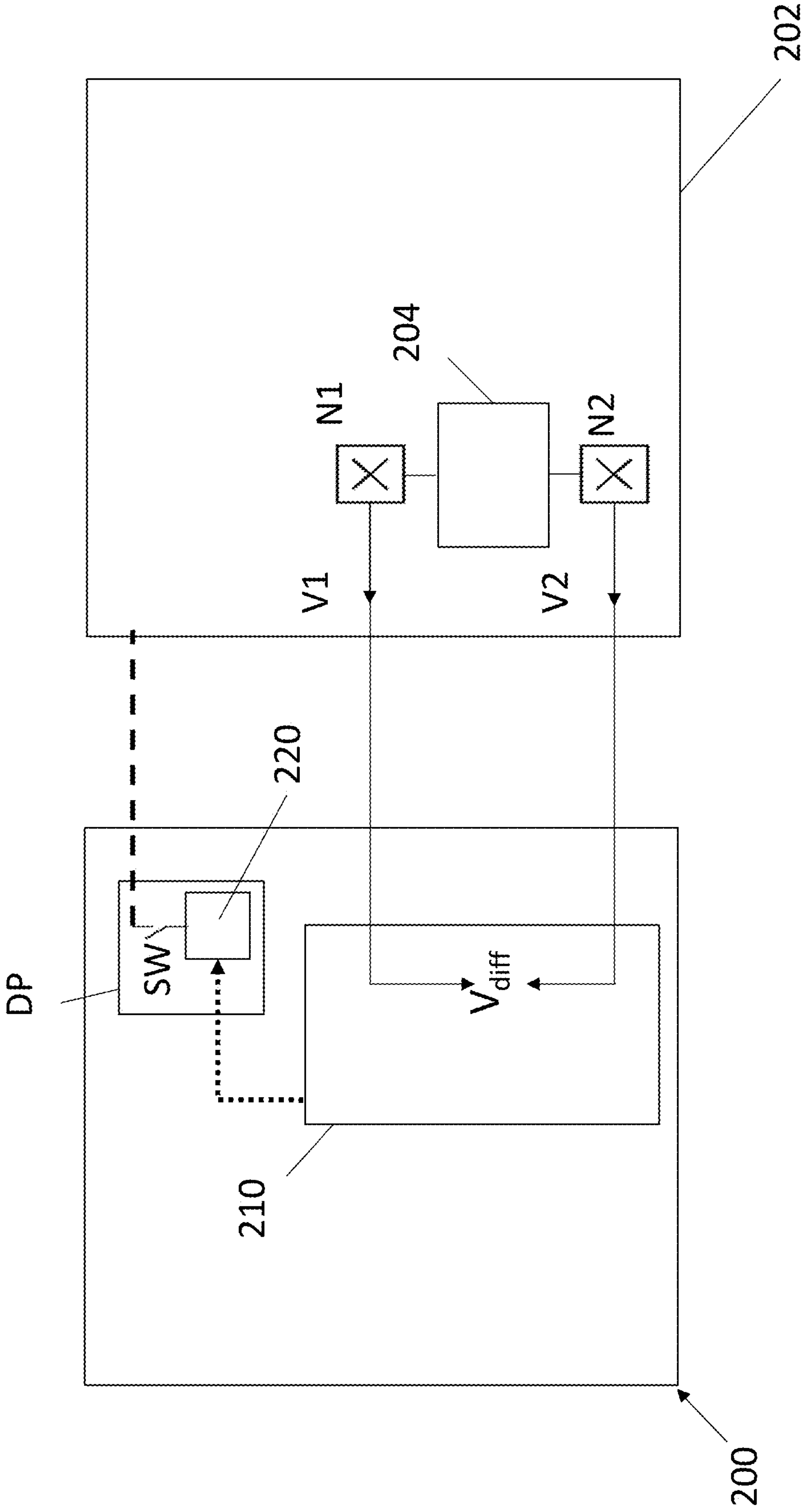
FIG. 7 is a diagram of another example embodiment of a discharge unit for a power converter according to the present disclosure.

FIG. 7 is a diagram of another example embodiment of a discharge unit 200 for a power converter 202 in accordance with a fourth embodiment of the present disclosure. The power converter 202 is the same as the power converter of FIG. 5, therefore the same labelling has been kept and the components are taken to have the same functionality and meaning as for FIG. 5. The discharge unit 200 is the same as the one in FIG. 5 with the addition of feature SW. Therefore the same labelling has been kept and the components are taken to have the same functionality and meaning as for the discharge unit 200 of FIG. 5. The discharge path DP comprises a clamping switch SW coupled to the first current source 220.

The voltage sensing unit 210 is configured to activate the discharge path DP for the power converter 200 when the voltage difference $V_{diff}$=(V2−V1) is greater than the threshold voltage $V_{thresh}$. When the voltage difference $V_{diff}$ is greater than the threshold voltage $V_{thresh}$, the voltage sensing unit 210 is configured to close the clamping switch SW hence activating the discharge path DP. Once the clamping switch SW is closed, the inductive unit 204 is discharged via the clamping switch SW. The clamping switch SW is configured to operate at the threshold voltage $V_{thresh}$, such that when the clamping switch is closed (on) it discharges the inductive element at a maximum voltage equal to the threshold voltage $V_{thresh}$. The voltage sensing unit 210 is configured to activate the first current source 220 when the voltage difference $V_{diff}$ is greater than the threshold voltage $V_{thresh}$. When the first current source 220 is activated, the clamping switch SW is closed and the inductive element 204 is discharged via the clamping switch SW.

The discharge unit 200 is also configured to deactivate the discharge path DP for the power converter 200 based on the voltage difference $V_{diff}$. The discharge unit 200 is configured to open the clamping switch SW when the voltage difference $V_{diff}$ is less than the threshold voltage $V_{thresh}$, thereby deactivating the discharge path DP for the power converter 200.

The voltage sensing unit 210 is configured to deactivate the discharge path DP when the voltage difference $V_{diff}$ is less than the threshold voltage $V_{thresh}$. When the voltage difference $V_{diff}$ is less than the threshold voltage $V_{thresh}$, the voltage sensing unit 210 is configured to deactivate the first current source 220. The clamping switch SW is coupled to the first current source 220. Hence, when the first current source 220 is deactivated, the clamping switch is opened.

In summary, the clamping switch SW acts to clamp the voltage that arises from the inductive element trying to discharge the stored magnetic energy. It does so by providing a safe discharging path for the current whilst keeping the voltage clamped at a safe value.

Figure 8A:
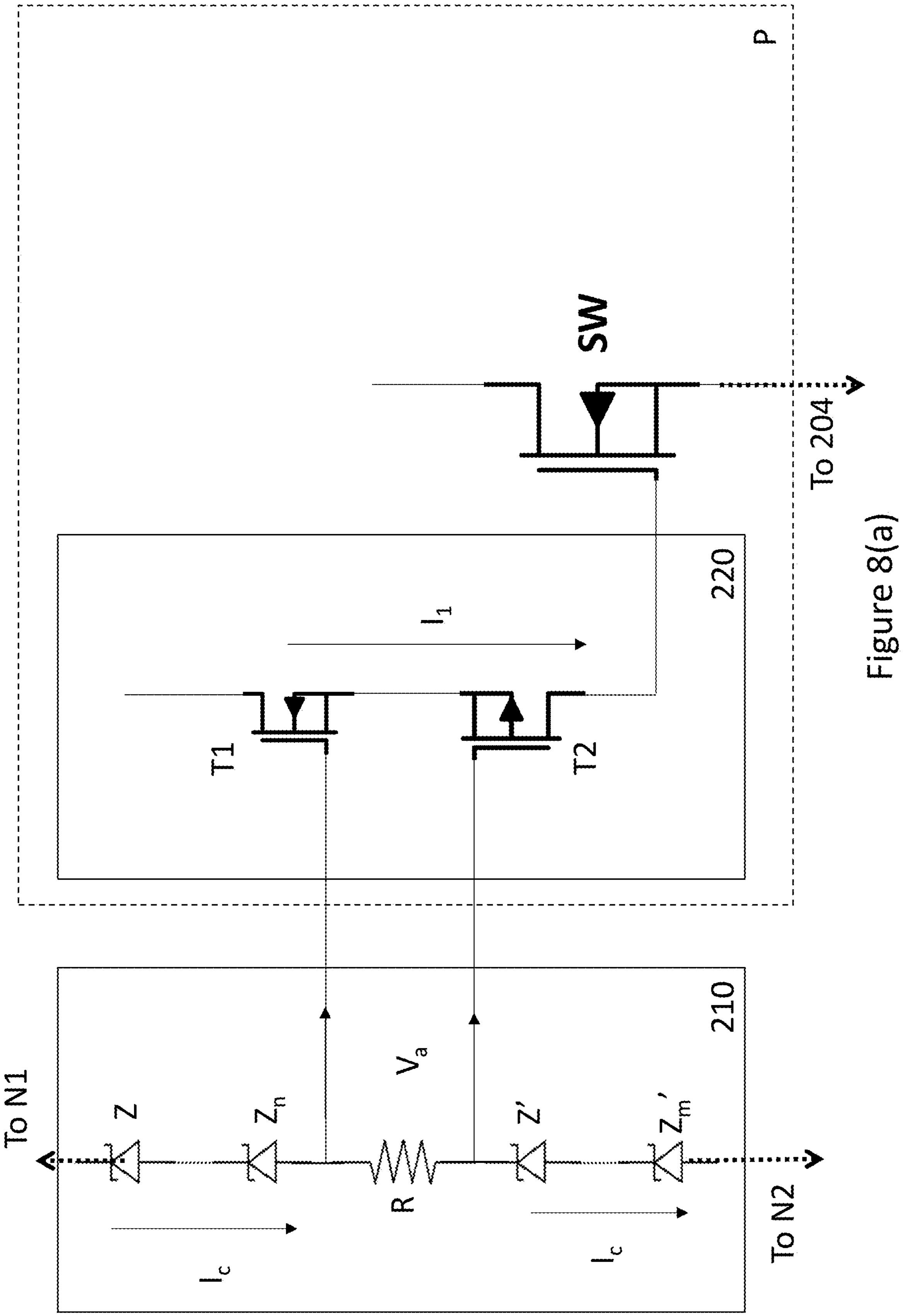
FIG. 8(*a*) is a diagram of an example embodiment of a voltage sensing unit activating a discharge path for a power converter.
Figure 8B:
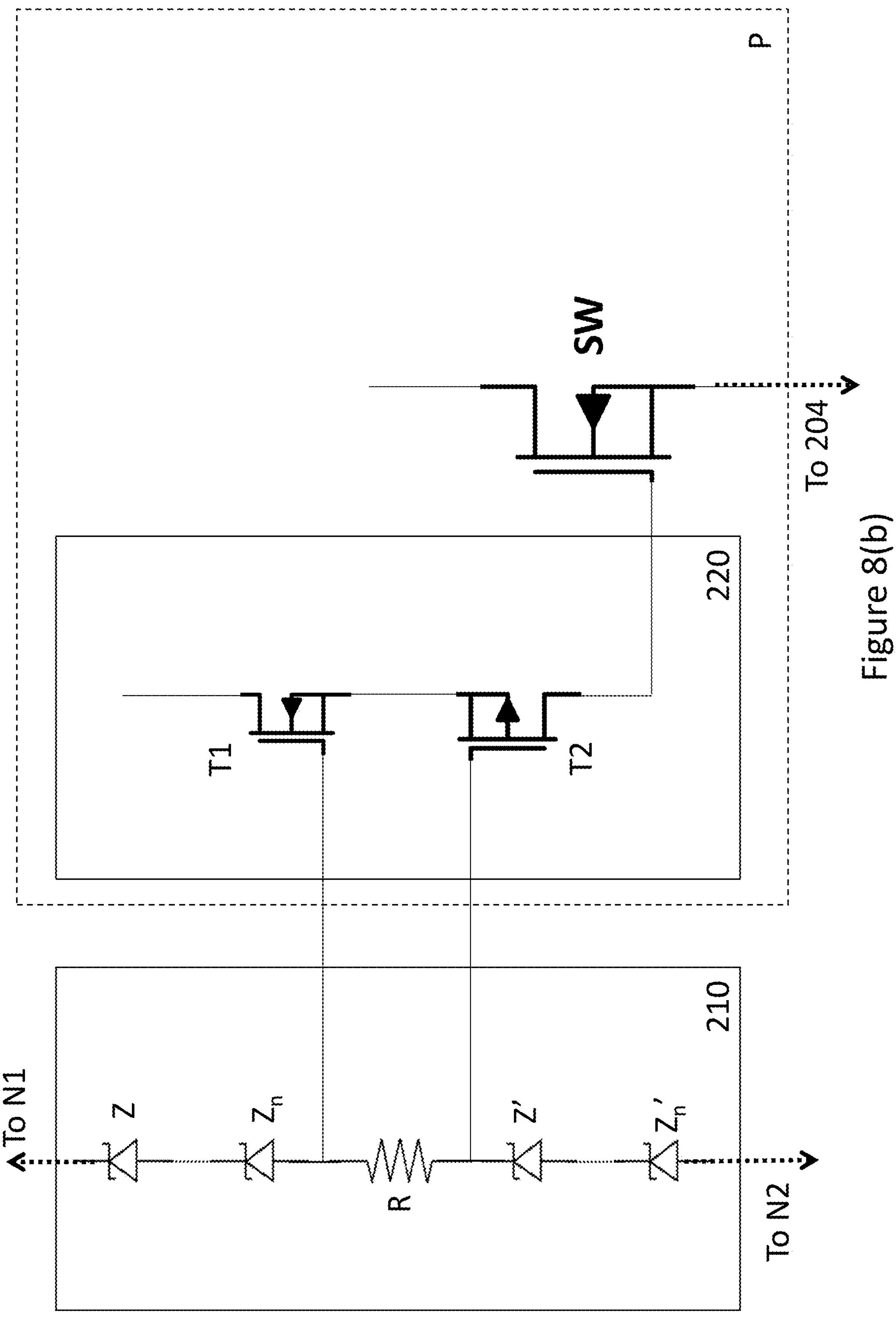

FIG. 8(*a*) is a diagram showing an example embodiment of a voltage sensing unit 210 activating a discharge path DP for a power converter 200. The arrows in the diagram pointing towards the nodes N1 and N2 illustrate the coupling points of the voltage sensing unit 210 to the nodes N1, N2. It is understood that other couplings may be possible in accordance with the understanding of the skilled person. Another arrow pointing towards the inductive element 204 illustrates the coupling point of the discharge path DP to the power converter 200. It is understood that other couplings may be possible in accordance with the understanding of the skilled person.

The voltage sensing unit 210 comprises a first series of one or more Zener diodes Z to $Z_n$ and a second series of one or more Zener diodes Z' $Z_m'$. In one example embodiment, the first series and the second series of one or more Zener diodes have the same total number of Zener diodes. In other words, n=m. The threshold voltage $V_{thresh}$ in this case would be proportional to the number of Zener diodes, n=m, in one of the series. In other words, $V_{thresh} \propto n \times V_{zener}$, where n is the total number of Zener diodes in one of the series and n=m. The voltage $V_{zener}$ is the breakdown voltage of each Zener diode. In another example embodiment, the first series and the second series of one or more Zener diodes do not have the same total number of Zener diodes. In other words, n is not equal to m. The threshold voltage $V_{thresh}$ in this case would be proportional to the total sum of Zener diodes in each series. In other words, $V_{thresh} \propto (n+m) \times V_{zener}$, where n is the total number of Zener diodes in the first series and m is the total number of Zener diodes in the second series. The voltage $V_{zener}$ is the breakdown voltage of each Zener diode. The voltage sensing unit 210 further comprises a resistive element R which is coupled between the first series of one or more Zener diodes and the second series of one or more Zener diodes. The resistive element could be, for example, a resistor. When the voltage difference $V_{diff}$ is greater than the threshold voltage $V_{thresh}$, a conduction current $I_c$ is conducted through the first series and the second series of one or more Zener diodes and across the resistive element R such that an activation voltage $V_a$ is generated. The voltage sensing unit 210 is shown as a combination of (integrated) Zener diodes and resistors. The voltage sensing unit 210 has the function to conduct current $I_c$ only when $V_{diff}$ (=V2−V1) has reached the threshold voltage $V_{thresh}$.

The discharge path DP comprises the first current source coupled to a clamping switch SW.

The first current source 220 comprises a first transistor T1 comprising a control terminal and a second transistor T2 comprising a control terminal. The first transistor T1 is coupled to the second transistor T2 in series. Both the first T1 and the second T2 transistors are coupled to the resistive element R of the voltage sensing unit 210 via their control terminals. When the activation voltage $V_a$ is generated, both the first transistor T1 and the second transistor T2 are turned on and they both conduct a first current $I_1$.

In this example embodiment, the clamping switch SW is a third transistor comprising a control terminal. The control terminal of the clamping switch SW is coupled to the first and second transistors. The clamping switch SW is configured to turn on (close) when it receives the first current $I_1$. The clamping switch SW is further configured to operate at a maximum voltage which is the threshold voltage $V_{thresh}$. When the voltage difference $V_{diff}$=(V2−V1) reaches the threshold voltage, the conduction current $I_c$ will start flowing through the voltage sensing unit 210 and generate the activation voltage $V_a$ needed to activate the first current source 220. If the clamping switch SW is properly sized, the control terminal of SW will be driven at the threshold voltage $V_{thresh}$ to allow the clamping switch SW to work in saturation while discharging inductive element 204.

The components of the voltage sensing unit 210, the first current source 220 and the clamping switch SW are chosen such as to withstand the appropriate voltage they are to be utilized with.

FIG. 8(*b*) is an alternative schematic of the voltage sensing unit 210 of FIG. 8(*a*) where the voltage sensing unit 210 is deactivating a discharge path DP for a power converter 200. The arrows in the diagram pointing towards the nodes N1 and N2 illustrate the coupling points of the voltage sensing unit 210 to the nodes N1, N2. It is understood that other couplings may be possible in accordance with the understanding of the skilled person. Another arrow pointing towards the inductive element 204 illustrates the coupling point of the discharge path DP to the power converter 200. It is understood that other couplings may be possible in accordance with the understanding of the skilled person. The voltage sensing unit 210 of this figure is the same as the one of FIG. 8(*a*), therefore the same labelling has been kept and the components are taken to have the same functionality and meaning as for FIG. 8(*a*). The discharge path DP comprises a first current source 220 coupled to a clamping switch SW. The first current source 220 and the clamping switch SW are the same as the ones in FIG. 8(*a*), therefore the same labelling has been kept and the components are taken to have the same functionality and meaning as for FIG. 8(*a*).

When the voltage difference $V_{diff}$ is less than the threshold voltage $V_{thresh}$, the conduction current $I_c$ is not conducted through the first series and the second series of one or more Zener diodes. Hence no activation voltage $V_a$ is generated across the resistive element R. The voltage sensing unit 210 has the function to conduct current $I_c$ only when $V_{diff}$ (=V2−V1) has reached the threshold voltage $V_{thresh}$. Hence when $V_{diff}$ is less than the threshold voltage no current $I_c$ is conducted.

As activation voltage $V_a$ is not generated, the first current source 220 is deactivated. Hence when the activation voltage $V_a$ is not generated, the first T1 and second T2 transistors are turned off. When both the first T1 and the second T2 transistors are turned off, they do not conduct the first current $I_1$. Once the inductive element 204 is discharged, the voltage difference $V_{diff}$ will fall back below the threshold voltage $V_{thresh}$. This causes the first current source 220 to deactivate and the clamping switch SW is turned off.

Figure 9:
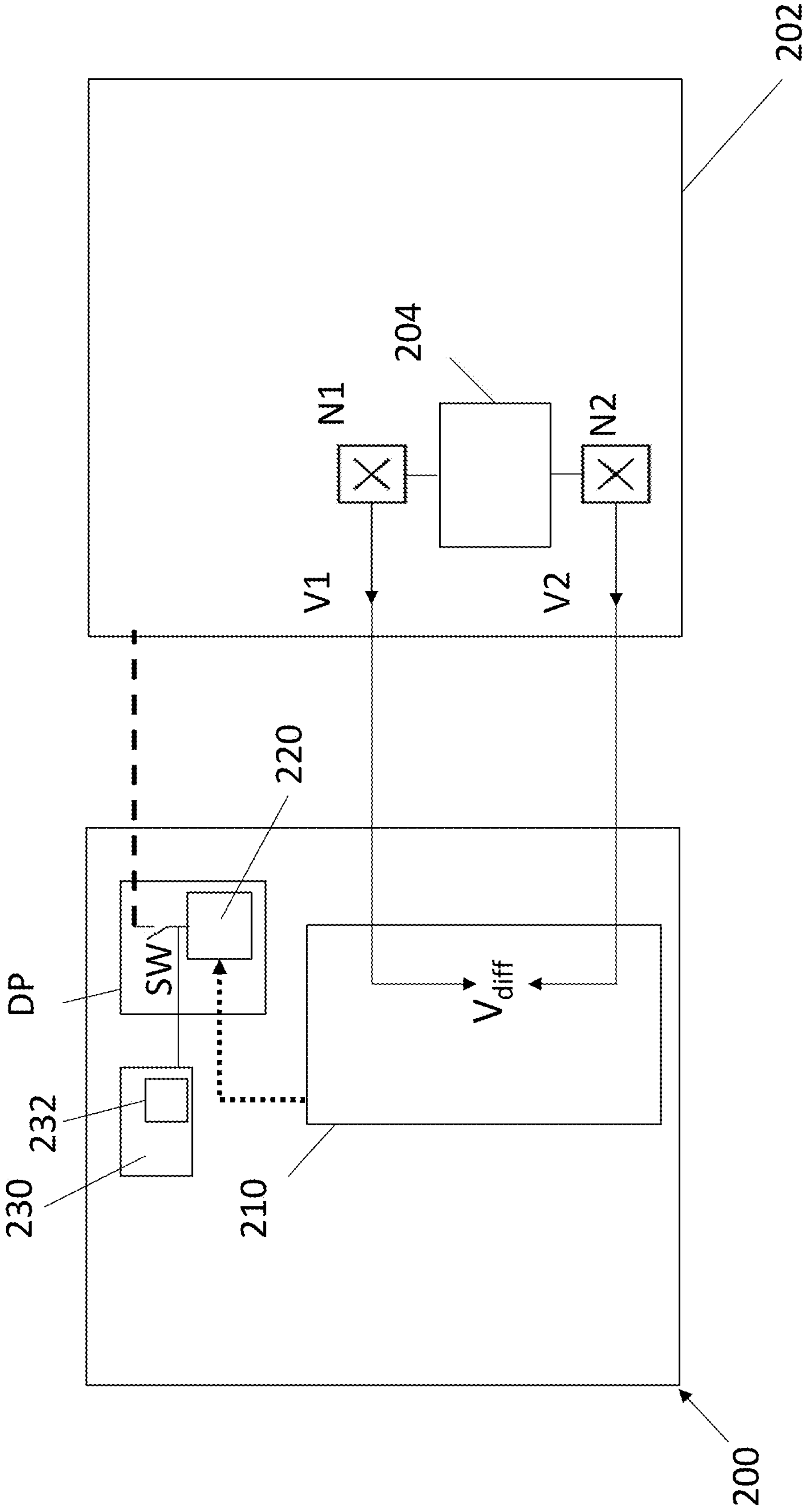
FIG. 9 is a diagram of another example embodiment of a discharge unit for a power converter according to the present disclosure.

FIG. 9 is a diagram of another example embodiment of a discharge unit 200 for a power converter 202 in accordance with a fifth embodiment of the present disclosure. The power converter 202 is the same as the power converter of FIG. 7, therefore the same labelling has been kept and the components are taken to have the same functionality and meaning as for FIG. 5. The discharge unit 200 is the same as the one for FIG. 7 with the additions of features 230 and 232. Therefore, the same labelling has been kept and the components are taken to have the same functionality and meaning as for the discharge unit 200 of FIG. 7. The discharge unit 200 further comprises a second current source 230 coupled to the clamping switch SW.

Figure 10:
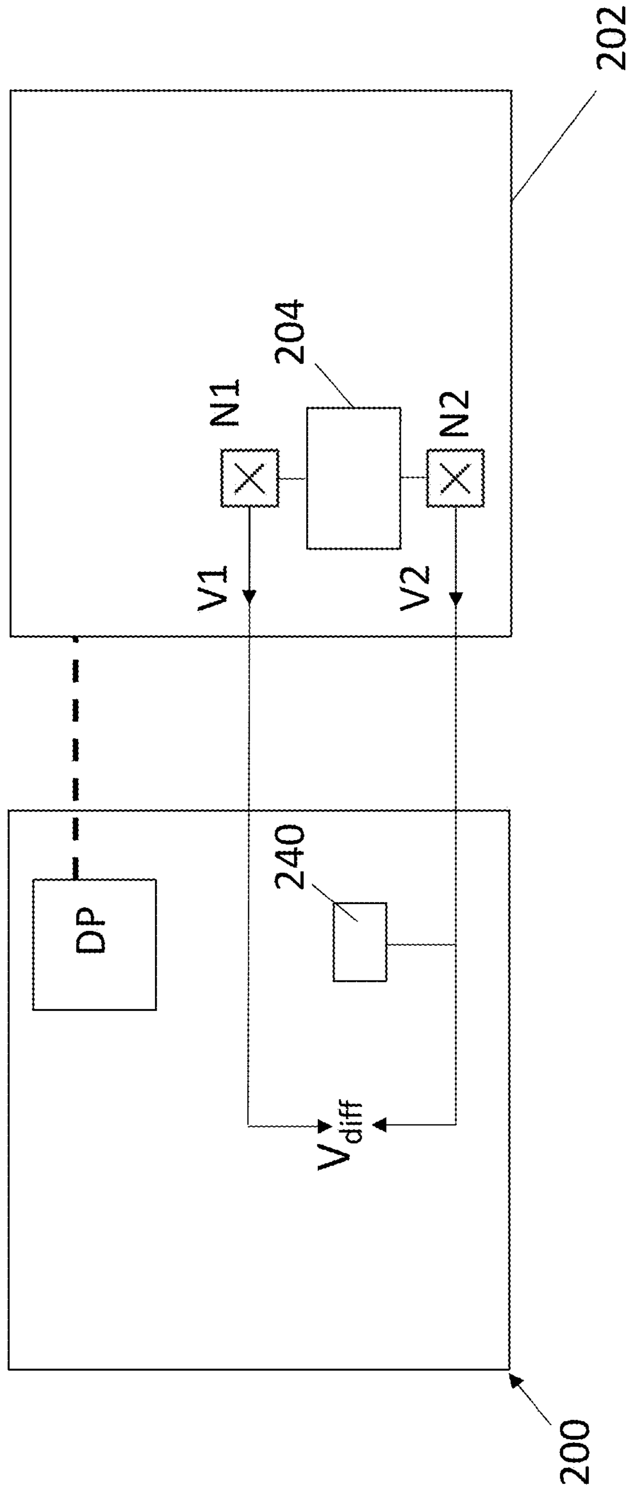
FIG. 10 is a diagram of another example embodiment of a discharge unit for a power converter according to the present disclosure.

The second current source 230 is configured to open the clamping switch SW when the voltage difference $V_{diff}$=(V2−V1) is less than the threshold voltage $V_{thresh}$. The second current source 230 comprises a resistive element 232. The resistive element 232 can be implemented as a resistor. This would be the easiest implementation as it makes the second current source 230 always active without the requirement of additional signals. The resistive element 232 can be implemented in any way that provides a current strong enough the keep the clamping switch off (open) when the voltage difference $V_{diff}$ is less than the threshold voltage $V_{thresh}$. Once the inductive element 204 is discharged, the voltage difference $V_{diff}$ will fall the threshold voltage $V_{thresh}$. This will deactivate the first current source 220 and the second current source will keep the clamping switch SW open (off). The clamping switch SW will naturally go in disable state, taking no quiescent current and not needing any control signal to operate FIG. 10 is a diagram of another example embodiment of a discharge unit 200 for a power converter 202 according to a sixth embodiment of the present disclosure. The power converter 202 is the same as the power converter of FIG. 2, therefore the same labelling has been kept and the components are taken to have the same functionality. The discharge unit 200 is the same as the one in FIG. 2 with the addition of feature 240. Therefore, the same labelling has been kept and the components are taken to have the same functionality and meaning as for the discharge unit 200 of FIG. 2. It will be appreciated that the additional feature 240 may be additionally applied to any discharge unit 200 described in the present disclosure.

The discharge unit 200 comprises an isolation device 240. The isolation device 240 is coupled to the second node N2 providing the second voltage V2. The isolation device 240 is configured to block a conductive path between the first node N1 and the second node N2 when the second node N2 is coupled to ground.

Figure 11:
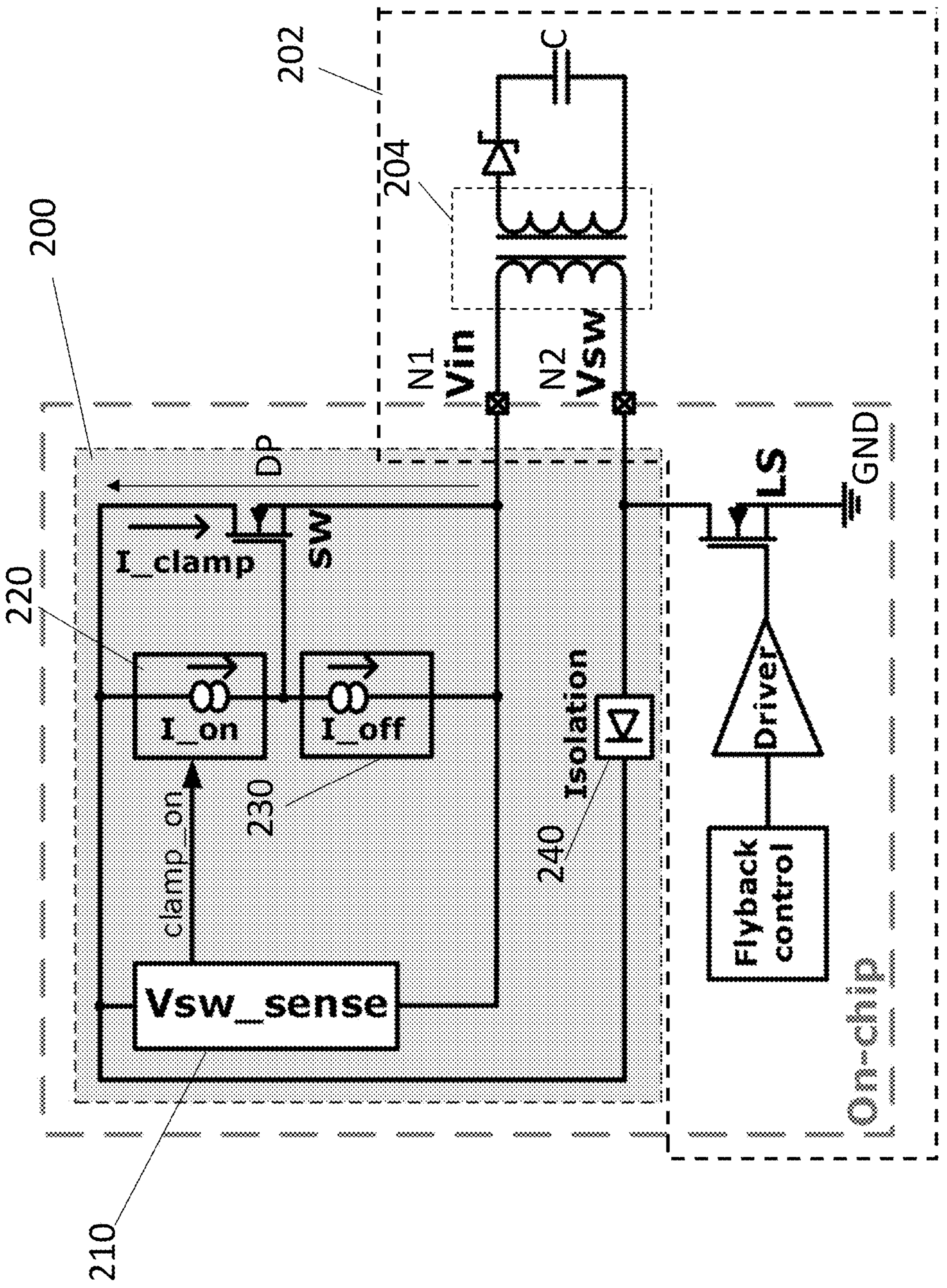
FIG. 11 is a diagram of another example embodiment of a discharge unit for a power converter according to the present disclosure.

FIG. 11 is a diagram of another example embodiment of a discharge unit 200 for a power converter 202 in accordance with a seventh embodiment of the present disclosure. The discharge unit 200 is taken to mean the same as any of the other example embodiments of a discharge unit in the present disclosure. Therefore, the same labelling has been kept and the components are taken to have the same meaning and functionality as already described. It will be appreciated that any of the features of the example embodiments described in the present disclosure may be applied to any of the discharge units 200 presented in this disclosure.

The power converter 202 comprises an inductive element 204 and a power switch LS coupled to ground GND. The inductive element 204 is coupled between a first node N1 providing a first voltage VIN and a second node N2 providing a second voltage VSW. It is understood that the first node N1 and second node N2 are equivalent to the first node N1 and second node N2 of other embodiments of the power converter 202 and that the first voltage VIN and the second voltage VSW are equivalent to the first voltage V1 and the second voltage V2 of other embodiments of the power converter 202. The power switch LS is also coupled to the second node N2 providing the second voltage VSW. The power switch LS is configured to operate in an on state or an off state. When the power switch LS is in the on state, the inductive element 204 is being charged. When the power switch LS is in the off state, the inductive element 204 is being discharged.

The discharge unit 200 comprises an isolation device 240. The isolation device is also coupled to the second node N2. The isolation device can be, for example, a passive diode. The isolation device 240 is configured to block a conductive path between the first node N1 and the second node N2 when the second node N1 is coupled to ground, for instance when the power switch LS in in the on state.

The voltage sensing unit 210 senses the difference between the second voltage VSW and the first voltage VIN and compares this to a threshold voltage $V_{thresh}$. When the difference (VSW−VIN) is greater than the threshold voltage $V_{thresh}$, the first current source 220 is activated (clamp_on) and the clamping switch SW is closed (on) such that the inductive element 204 is discharged via discharge path DP. When the difference (VSW−VIN) is less than the threshold voltage $V_{thresh}$, the first current source 220 is deactivated and the clamping switch SW is open (off) such that the discharge path DP is also deactivated.

In the example embodiment of FIG. 11, the discharge unit 200 is shown as an on-chip solution being applied to a power converter 202. The clamping switch SW is a transistor. The power converter 202 in FIG. 11 is shown as a flyback converter but it could be any type of DC power converter. For example, it could be a boost converter.

Figure 12:
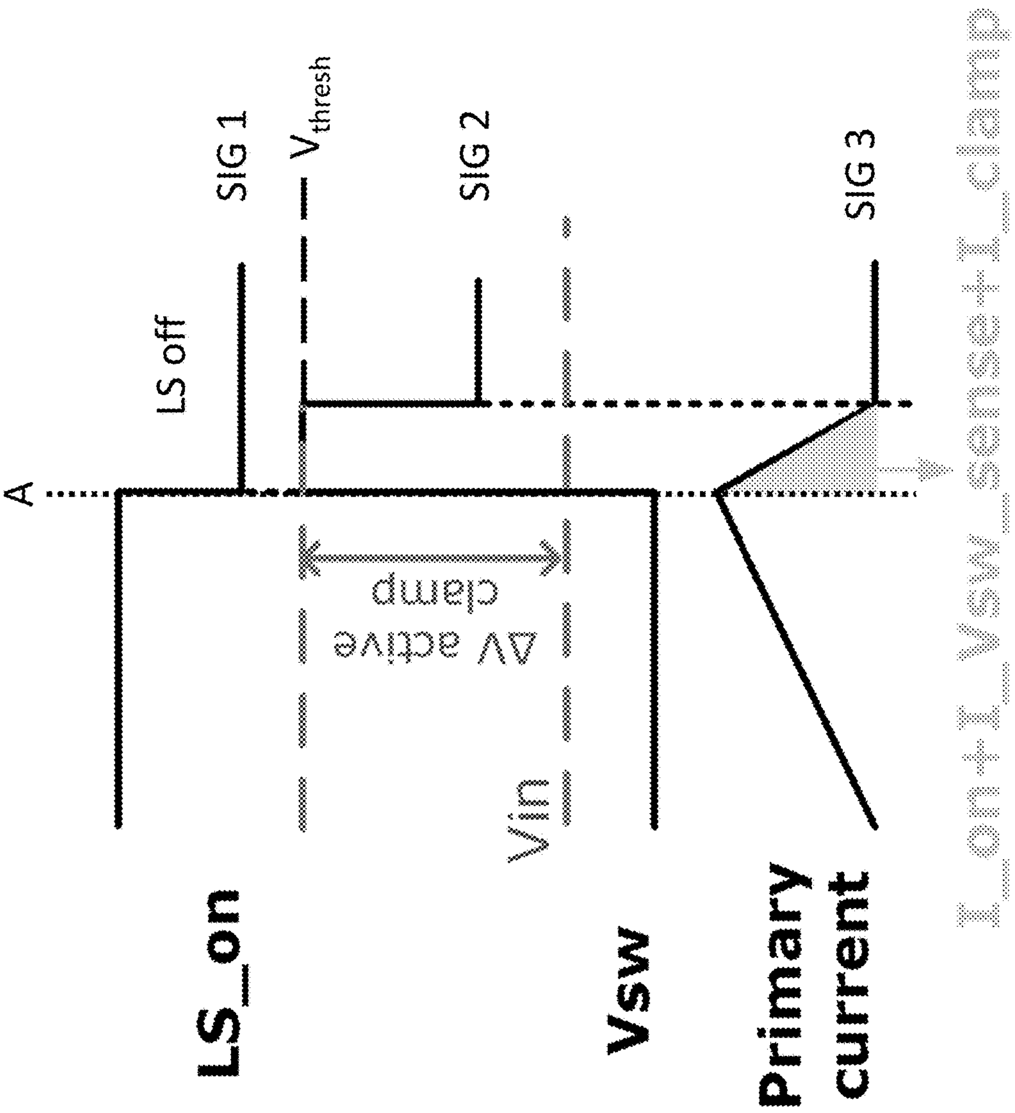
FIG. 12 is a graphical representation of how the discharge unit of FIG. 11 operates.

FIG. 12 is a timing graph showing how the voltage sensing unit 200 for power converter 202 shown in FIG. 11 operates.

The top plot SIG 1 is a waveform of a control signal which controls the operation of the power switch LS. Prior to point A, the waveform of SIG 1 is high and the power switch LS is configured in the on state. Therefore, the inductive element 204 is being charged. After point A, the waveform of SIG 1 is low and the power switch LS is configured in the off state.

The middle plot SIG 2 shows the voltage VSW at the second node N2 compared to the voltage VIN at the first node N1. Prior to point A, the voltage difference $V_{diff}$ between VSW and VIN is below the threshold voltage $V_{thresh}$, hence the discharge path DP is deactivated. At point A, when the power switch LS goes into the off state, the voltage across the second node N2 increases by an amount Δvactive_clamp above the voltage across the first node N1. Hence, the voltage difference $V_{diff}$ is greater than the threshold voltage $V_{thresh}$ and the discharge path DP is activated.

The bottom plot SIG 3 shows the current through the inductive element 204. Prior to point A, when the power switch LS is closed, the inductive element 204 is being charged and hence the current SIG 3 is increasing. At point A, the inductive element 204 begins to discharge through the activated discharge path P. Therefore, the current SIG 3 decreases. It decreases by an amount equal to the summation of I_Vsw_sense, I_on, I_clamp. These are the currents which flow through voltage sensing unit 210, the first current source 220 and the clamping switch SW.

When SIG 2 is below the chosen threshold voltage $V_{thresh}$, the first current source 220 is inactive. The second current source 230 keeps the voltage across the control terminal of the clamping switch SW to zero so that current through the clamping switch I_clamp is equal to zero. The discharge unit 200 is not disturbing the normal operations of the power converter 202 and is taking no current at all.

When the power switch LS is turned off, a leakage inductance of the inductive element 204 keeps forcing a current into the second node N2. Therefore, the voltage at this node will start rising. At the chosen threshold voltage $V_{thresh}$, the voltage sensing unit 210 will activate the first current source 220. If negative feedback is properly implemented, the control terminal of the clamping switch SW will be kept at the threshold voltage $V_{thresh}$ such that the clamping switch SW is in saturation with a drain-source voltage equal to ΔVactive clamp and the clamping switch SW will be able to dissipate the energy stored in the inductive element 204 whilst the voltage at the second node N2 is kept at the desired clamped voltage.

Figure 13:
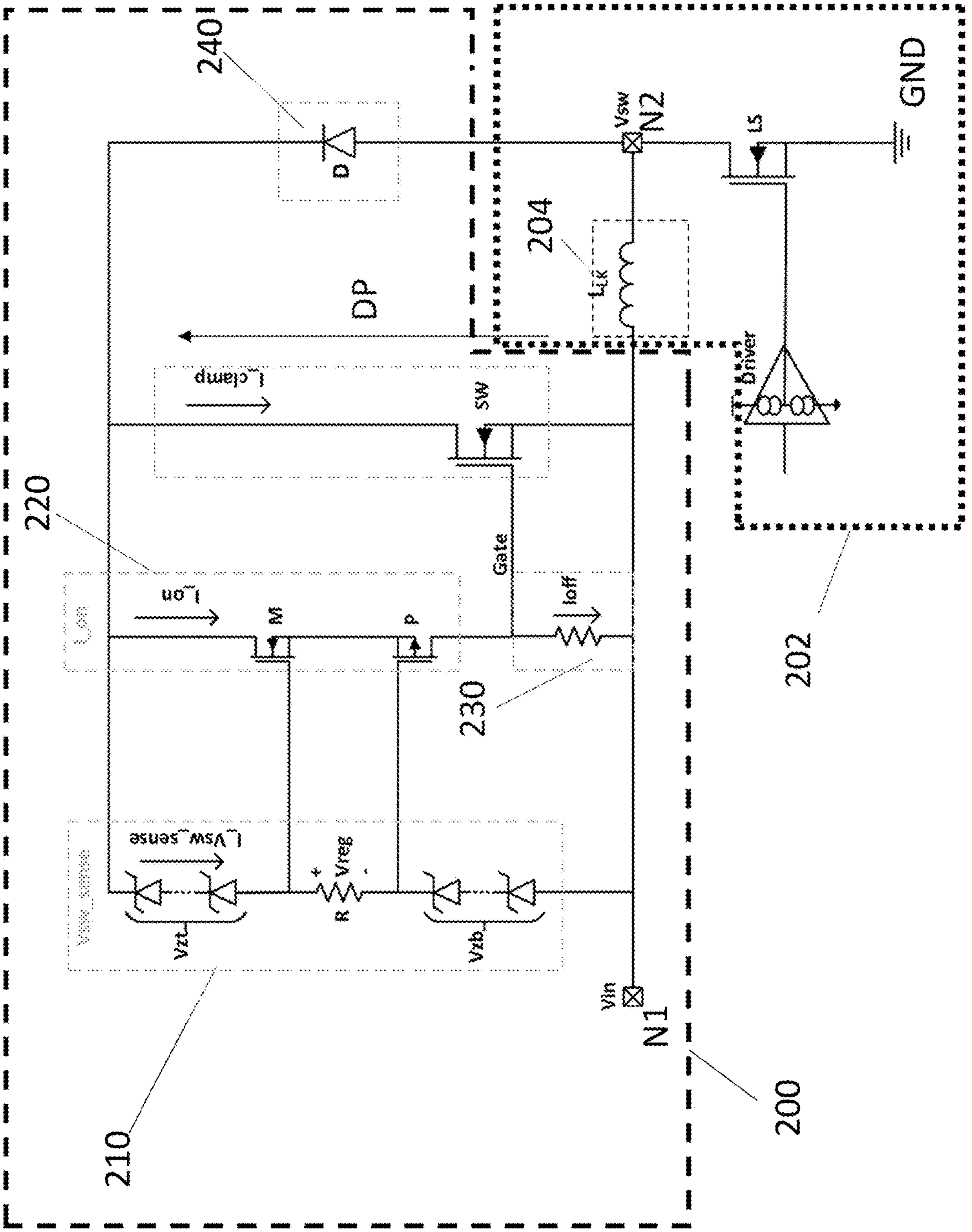
FIG. 13 is a diagram of another example embodiment of a discharge unit for a power converter according to the present disclosure.

FIG. 13 is another example embodiment of a discharge unit 200 for a power converter 202, in accordance with an eighth embodiment of the present disclosure. The discharge unit 200 of this figure is taken to be any of the discharge units described in the present disclosure, as such the same labelling has been kept and the components are taken to have the same meaning and functionality as already described. It will be appreciated that any of the features in the example embodiments described previously in the present disclosure may be applied to any of the discharge units 200 of this disclosure.

In this example embodiment the inductive element 204 of the power converter 202 is depicted as an inductor. The isolation device 240 is implemented as a passive diode D. However, the isolation device 240 can be any element able to block the conduction from the first node N1 to the second node N2 when the second node N2 is coupled to ground GND when the power switch LS is on.

Figure 14A:
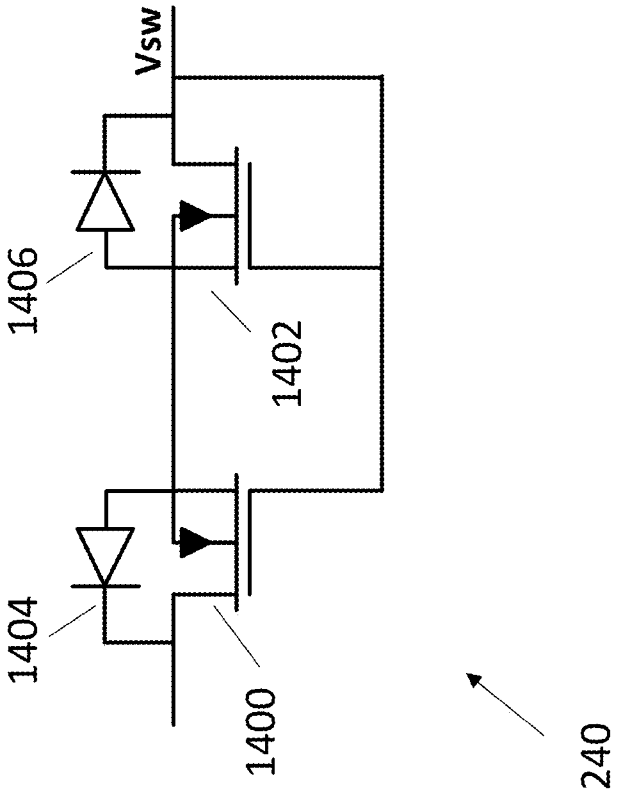
FIG. 14(*a*) is a first example embodiment of an isolation device that can be used with any of the discharge units of the present disclosure.
Figure 14B:
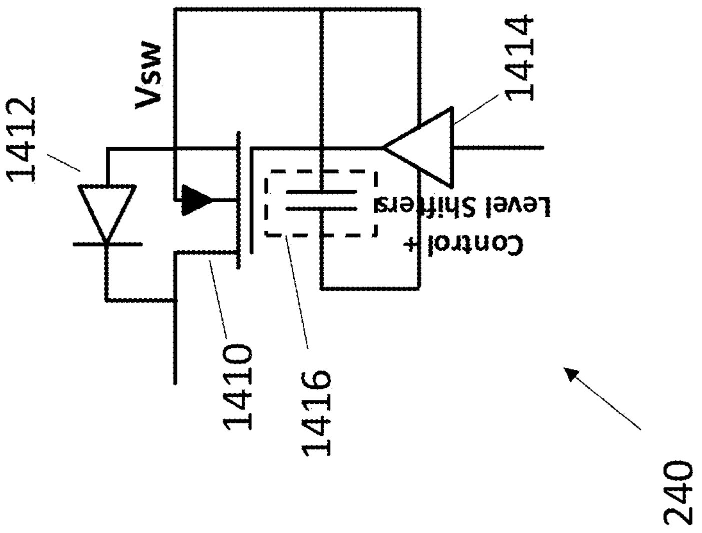

The isolation device 240 could also be an active diode. FIGS. 14(*a*) and 14(*b*) show example embodiments of active diodes that can be used as part of the isolation device 240 in any of the discharge units 200 of the present disclosure.

FIG. 14(*a*) is a first example embodiment of an isolation device 240 that can be used with any of the discharge units 200 of the present disclosure, in accordance with the understanding of the skilled person. The first example embodiment of isolation device 240 shown in FIG. 14(*a*) comprises a first transistor 1400, a second transistor 1402, a first diode 1404 and a second diode 1406 The first 1400 and second 1402 transistors both comprise a source terminal and a drain terminal. The first 1400 and second 1402 transistors are coupled in series such that they are coupled together via their source terminals. The first diode 1404 is coupled in parallel across the source and drain terminals of the first transistor 1400 and the second diode 1406 is coupled in parallel across the source and drain terminal of the second transistor 1402.

FIG. 14(*b*) is a second example embodiment of an isolation device 240 that can be used with any of the discharge units 200 of the present disclosure, in accordance with the understanding of the skilled person. The second example embodiment of isolation device 240 shown in FIG. 14(*b*) comprises a first transistor 1410, a first diode 1412, a second diode 1414 and a resistance 1416 The first transistor 1410 comprises a source terminal, a drain terminal and a control terminal. The first diode 1412 is coupled in parallel to the first transistor 1410 across the drain and source terminals of the first transistor 1410 The second diode 1414 is coupled in series to the control terminal of the first transistor 1410 and the resistance 1416 is coupled to the source terminal of the first transistor 1410.

Returning to FIG. 13, the voltage sensing unit 210 is shown as a combination of (integrated) Zener diodes and resistors. However, the voltage sensing unit 210 could be any of the embodiments described herein. The voltage sensing unit 210 has the function to conduct current only when the voltage difference $V_{diff}$ between the voltage VSW at the second node N2 and the voltage VIN at the first node N1 has reached the threshold voltage and in consequence to activate the first current source 220 with a negative feedback that keeps the voltage at the second node N2 from drifting away.

The second current source 230 is implemented as a resistor as it is the easiest implementation as it makes the second current source 230 always active with no need of additional signals. But it can be implemented in any other way that provides a current strong enough the keep the control terminal of the clamping switch SW to zero when the discharge path needs to stay deactivated. For example, the second current source can be implemented using transistors.

Once the inductive element 204 is discharged, the voltage difference between VSW and VIN will fall back below the threshold voltage, which will cause the first current source 220 to deactivate and the second current source 230 to keep the control terminal of the clamping switch SW to zero. So, the clamping switch SW will naturally go in disable state, taking no quiescent current and not needing any control signal to operate.

The voltage across the clamping switch SW is therefore defined as:

$$\Delta V \text{ active clamp} = Vzb + Vreg + Vzt + VD$$

Where Vzb is the threshold voltage for the first series of Zener diodes in the voltage sensing unit 210, Vzt is the threshold voltage for the second series of Zener diodes, Vreg is the activation voltage (it is equivalent to $V_a$) and VD is the voltage across the isolation device 240. Notice that the activation voltage can also be defined in terms of the first transistor M (T1) and the second transistor P (T2) of the first current source 220. The activation voltage is also equal to VSGp+VGSm, which are the control terminal voltages of the first M and second DP transistors. The voltage sensing unit 210 be implemented as a combination of an arbitrary series of different components to generate the desired threshold voltage. Any combination of Zener diodes, resistors and diode-connected transistors can be used to define the threshold voltage.

Those skilled in the art will be able to recognize and analyse the in-built negative feedback that prevents voltage VSW at the second node N2 from drifting away from ΔV active clamp. When the voltage at the second node N2 reaches ΔV active clamp, a conduction current through the voltage sensing unit 210 will start flowing and generate the activation voltage Vreg needed to activate I_on. If the clamping switch SW is properly sized, its control terminal will be driven at the right voltage to allow the clamping switch SW to work in saturation with a drain-source voltage equal to (ΔV active clamp−VD) while discharging the inductive element 204. If the voltage at the second node N2 rises above ΔV active clamp, then the current through the voltage sensing block 210 would increase, which would cause Vreg to increase and therefore the first current source 220 current to increase. This would cause the control terminal voltage of the clamping switch SW to increase and the current though the clamping switch I_clamp to increase, which would have the counteracting effect of reducing the voltage at the second node N2.

It is preferable that the components of the disclosed circuit be chosen to withstand the appropriate operational voltage of the system, in accordance with the understanding of the skilled person.

In the specific case of high voltage gate drive units (GDUs), the discharge unit 200 of the present disclosure allows the integration of both the controller of the power converter (in this case a flyback controller) and the voltage clamp (the discharge unit) onto GDU die, reducing the expense and area of the GDU board.

Figure 15:
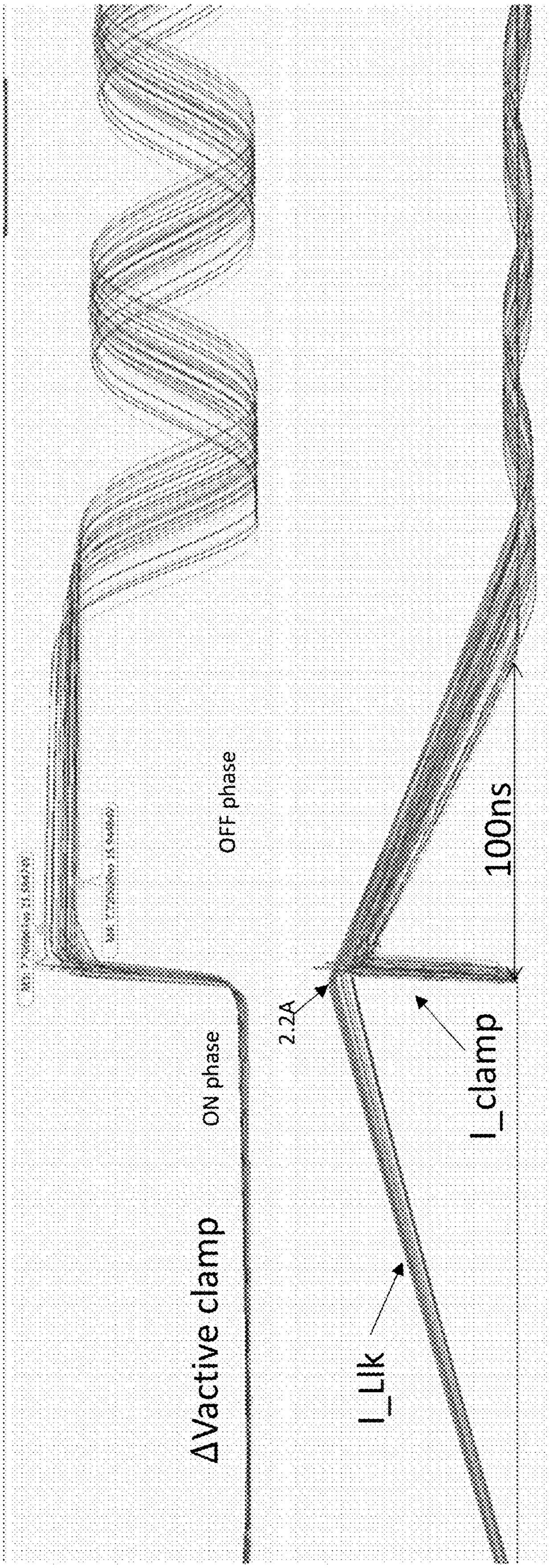
FIG. 15 is a graph showing simulation results using a discharge unit of FIG. 13 part of a gate drive unit.

FIG. 15 is a graph showing simulation results using the discharge unit 200 of FIG. 13 as part of a gate drive unit (GDU). The simulation was run across all process and temperature corners of the discharge unit 200 and the power converter 200 (implemented as a flyback converter) for the case when a 1 uH inductive element 204 is charged up to about 2 A.

When the power switch LS is switched off, the discharge unit 204 reacts to clamp the second node N2 and allows a discharging path (I_on and I_Vsw_sense not shown here).

For the particular process used in these simulations, ΔV active clamp spreads over corners from a minimum of about 16V to a maximum of about 21.6V. These minimum and maximum limits need to be chosen such as the lower limit doesn't interfere with the normal operations of the power converter and the higher limit needs to stay below the voltage which causes reliability concern for the devices and components that must withstand it. This spread can also be reduced by accurate choice of the components used in the voltage sensing unit 210 and good layout practice. In cases where ΔV active clamp needs to be very accurate, trimming strategies can be put in place in the voltage sensing unit 210.

Figure 16:
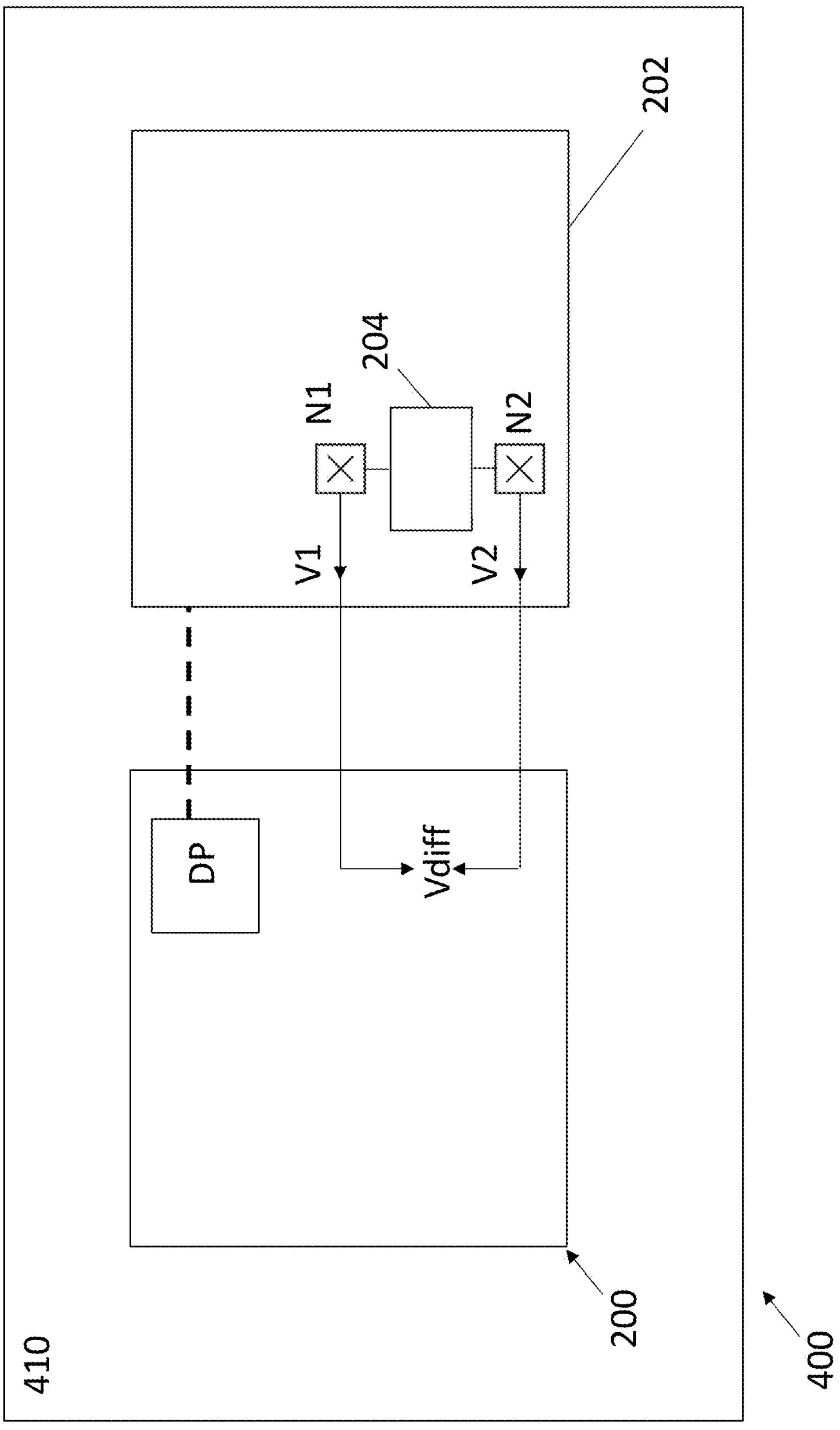
FIG. 16 is a diagram of an apparatus comprising any of the discharge units of the present disclosure.

In the specific case of the isolated high voltage GDU for traction inverters the discharge unit 200 of the present disclosure was estimated to be only about 6% of the die area of the primary side of the Isolated GDU FIG. 16 is a diagram of an apparatus 400 in accordance with a ninth embodiment of the present disclosure. The apparatus 400 comprises a power converter 202 comprising an inductive element 204 and a discharge unit 200 for the power converter 202. The discharge unit 200 can be one any of the embodiments described in the present disclosure. The apparatus 400 further comprises a chip 410. The discharge unit 200 and the power converter 202 are implemented on the chip 410. The discharge unit 200 is configured to sense a voltage difference $V_{diff}$ across the inductive element 204 and activate a discharge path DP for the power converter 202 based on the voltage difference $V_{diff}$.

The apparatus 400 could be, for example, a gate drive unit for a traction inverter.

Figure 17:
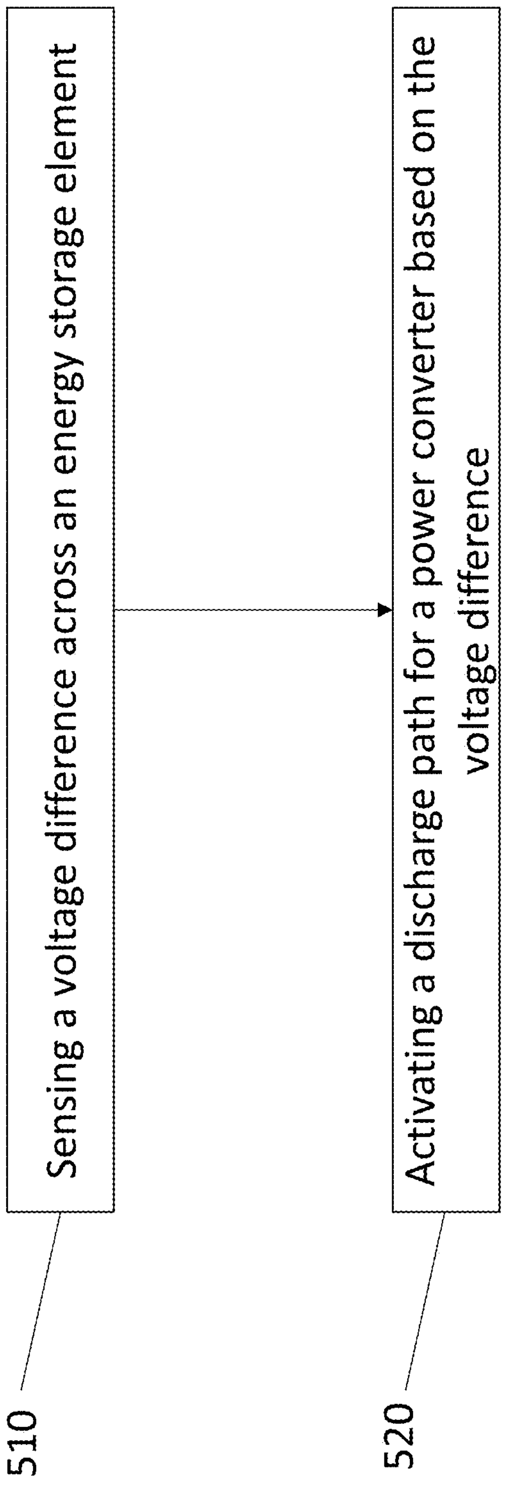
FIG. 17 is a flow chart showing a method of discharging a power converter according to the present disclosure.

FIG. 17 is a flow chart showing a method of discharging a power converter comprising an inductive element according to a tenth embodiment of the present disclosure.

At step 510, a voltage difference is sensed across the inductive element. Then at step 520 a discharge path is activated for the power converter, based on the voltage difference.

It will be appreciated that power converters of the present disclosure may be flyback converters for gate drive units. Further embodiments may relate to power converters for other applications and for other input voltages, in accordance with the understanding of the skilled person.

Various improvements and modifications may be made without departing from the scope of the disclosure.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A discharge unit for a power converter comprising an inductive element, the discharge unit configured to:

sense a voltage difference across the inductive element; and activate a discharge path for the inductive element in the power converter based on the voltage difference, wherein the discharge path comprises a first current source and a clamping switch coupled to the first current source, wherein the discharge path is activated by activating the first current source to close the clamping switch, the inductive element being discharged via the clamping switch.

2. The discharge unit of claim 1 comprising a voltage sensing unit for sensing the voltage difference across the inductive element.

3. The discharge unit of claim 2, wherein the inductive element is coupled between a first node providing a first voltage and a second node providing a second voltage.

4. The discharge unit of claim 3, wherein:

the voltage sensing unit is configured to receive the first voltage and the second voltage; and the voltage difference is a difference between the first voltage and the second voltage.

5. The discharge unit of claim 2, wherein:

the voltage sensing unit is configured to compare the voltage difference to a threshold voltage; and the discharge unit is configured to activate the discharge path based on the comparison of the voltage difference to the threshold voltage, thereby activating the discharge path based on the voltage difference.

6. The discharge unit of claim 2, wherein the discharge unit is configured to deactivate the discharge path for the power converter based on the voltage difference.

7. The discharge unit of claim 6, wherein:

the voltage sensing unit is configured to compare the voltage difference to a threshold voltage; and the discharge unit is configured to deactivate the discharge path based on the comparison of the voltage difference to the threshold voltage, thereby deactivating the discharge path based on the voltage difference.

8. The discharge unit of claim 7, wherein:

the voltage sensing unit is configured to deactivate the discharge path for the power converter when the voltage difference is less than the threshold voltage, thereby deactivating the discharge path based on the comparison of the voltage difference to the threshold voltage.

9. The discharge unit of claim 2, wherein:

the voltage sensing unit is configured to compare the voltage difference to a threshold voltage; and the discharge unit is configured to activate the discharge path based on the comparison of the voltage difference to the threshold voltage, thereby activating the discharge path based on the voltage difference.

10. The discharge unit of claim 9, wherein:

the voltage sensing unit is configured to activate the discharge path for the power converter when the voltage difference is greater than the threshold voltage, thereby activating the discharge path based on the comparison of the voltage difference to the threshold voltage; and the voltage sensing unit is configured to activate the first current source when the voltage difference is greater than the threshold voltage.

11. The discharge unit of claim 2, wherein:

the voltage sensing unit is configured to activate the discharge path for the power converter when the voltage difference is greater than a threshold voltage, thereby activating the discharge path based on the comparison of the voltage difference to the threshold voltage; and the discharge unit is configured to close the clamping switch when the voltage difference is greater than the threshold voltage.

12. The discharge unit of claim 11, wherein the inductive element is discharged via the clamping switch when the voltage difference is greater than the threshold voltage.

13. The discharge unit of claim 2, wherein the discharge unit is configured to deactivate the discharge path for the power converter based on the voltage difference.

14. The discharge unit of claim 13, wherein:

the voltage sensing unit is configured to compare the voltage difference to a threshold voltage; and the discharge unit is configured to deactivate the discharge path based on the comparison of the voltage difference to the threshold voltage, thereby deactivating the discharge path based on the voltage difference.

15. The discharge unit of claim 14, wherein:

the voltage sensing unit is configured to deactivate the discharge path for the power converter when the voltage difference is less than the threshold voltage, thereby deactivating the discharge path based on the comparison of the voltage difference to the threshold voltage; and the voltage sensing unit is configured to deactivate the first current source if the voltage difference is less than the threshold voltage.

16. The discharge unit of claim 13, wherein the discharge unit comprises a second current source coupled to the clamping switch.

17. The discharge unit of claim 16, wherein the second current source is configured to open the clamping switch when the voltage difference is less than a threshold voltage.

18. The discharge unit of claim 3, wherein the discharge unit comprises an isolation device.

19. The discharge unit of claim 18, wherein:

the isolation device is coupled to the second node providing the second voltage; and the isolation device is configured to block a conductive path between the first node and the second node when the second node is coupled to ground.

20. An apparatus comprising:

a power converter comprising an inductive element; and a discharge unit for the power converter, the discharge unit configured to:

sense a voltage difference across the inductive element; and activate a discharge path for the inductive element in the power converter based on the voltage difference, wherein the discharge path comprises a first current source and a clamping switch coupled to the first current source, wherein the discharge path is activated by activating the first current source to close the clamping switch, the inductive element being discharged via the clamping switch.

21. The apparatus of claim 20 comprising a chip, the power converter and the discharge unit being implemented on the chip.

22. A method of discharging a power converter comprising an inductive element, the method comprising:

sensing a voltage difference across the inductive element; and activating a discharge path for the inductive element in the power converter based on the voltage difference, wherein the discharge path comprises a first current source and a clamping switch coupled to the first current source, wherein the discharge path is activated by activating the first current source to close the clamping switch, the inductive element being discharged via the clamping switch.

* * * * *